US010941000B2

(12) United States Patent
Wagner et al.

(10) Patent No.: US 10,941,000 B2
(45) Date of Patent: Mar. 9, 2021

(54) SYSTEMS AND METHODS FOR PROCESSING OBJECTS, INCLUDING AUTOMATED LINEAR PROCESSING STATIONS

(71) Applicant: Berkshire Grey, Inc., Lexington, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, San Jose, CA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Bedford, MA (US)

( * ) Notice: Subject to any disclaimer, the term of this patent is extended or adjusted under 35 U.S.C. 154(b) by 0 days.

(21) Appl. No.: 15/934,396

(22) Filed: Mar. 23, 2018

(65) Prior Publication Data
US 2018/0273296 A1    Sep. 27, 2018

Related U.S. Application Data

(60) Provisional application No. 62/475,421, filed on Mar. 23, 2017.

(51) Int. Cl.
*B65G 1/137*   (2006.01)
*B25J 9/00*    (2006.01)
(Continued)

(52) U.S. Cl.
CPC ........ *B65G 1/1376* (2013.01); *B25J 9/0093* (2013.01); *B25J 9/026* (2013.01); *B25J 9/1612* (2013.01);
(Continued)

(58) Field of Classification Search
CPC ..................................................... B25J 9/0093
See application file for complete search history.

(56) References Cited

U.S. PATENT DOCUMENTS

| 3,592,326 A | 7/1971 | Zimmerle et al. |
| 4,722,653 A | 2/1988 | Williams et al. |

(Continued)

FOREIGN PATENT DOCUMENTS

| AU | 2006204622 A1 | 3/2007 |
| CN | 106164852 A | 11/2016 |

(Continued)

OTHER PUBLICATIONS

International Search Report & Written Opinion issued by International Searching Authority in related International Patent Application PCT/US2018/024055 on Jun. 27, 2018,12 pgs.
(Continued)

*Primary Examiner* — Thomas Randazzo
(74) *Attorney, Agent, or Firm* — Gesmer Updegrove LLP

(57) ABSTRACT

A method of processing objects using a programmable motion device is disclosed. The method includes the steps of perceiving identifying indicia representative of an identity of
(Continued)

a plurality of objects and directing the plurality of objects toward an input area from at least one input conveyance system, acquiring an object from the plurality of objects at the input area using an end effector of the programmable motion device, and moving the acquired object toward an identified processing location using the programmable motion device. The identified processing location is associated with the identifying indicia and the identified processing location is provided as one of a plurality of processing locations along a first direction. The step of moving the acquired object includes moving the programmable motion device along a second direction that is substantially parallel with the first direction.

25 Claims, 21 Drawing Sheets

(51) Int. Cl.
*G06Q 10/08* (2012.01)
*B25J 9/16* (2006.01)
*B65G 47/82* (2006.01)
*B25J 9/02* (2006.01)
*B65G 47/90* (2006.01)

(52) U.S. Cl.
CPC .......... *B25J 9/1615* (2013.01); *B65G 1/1371* (2013.01); *B65G 1/1378* (2013.01); *B65G 47/82* (2013.01); *B65G 47/905* (2013.01); *G06Q 10/087* (2013.01); *B65G 2201/0258* (2013.01)

(56) References Cited

U.S. PATENT DOCUMENTS

| | | | |
|---|---|---|---|
| 6,011,998 A * | 1/2000 | Lichti | B65G 1/1376 414/268 |
| 6,059,092 A * | 5/2000 | Jerue | B65G 1/1373 198/364 |
| 6,377,867 B1 | 4/2002 | Bradley et al. | |
| 6,505,093 B1 * | 1/2003 | Thatcher | B65G 1/1376 700/214 |
| 6,579,053 B1 | 6/2003 | Grams et al. | |
| 9,272,845 B2 | 3/2016 | Honkanen et al. | |
| 9,481,518 B2 | 11/2016 | Neiser | |
| 9,492,923 B2 | 11/2016 | Wellman et al. | |
| 9,751,693 B1 | 9/2017 | Battles et al. | |
| 9,878,349 B2 | 1/2018 | Crest et al. | |
| 9,926,138 B1 * | 3/2018 | Brazeau | B65G 1/1376 |
| 9,999,977 B2 | 6/2018 | Wagner et al. | |
| 10,007,827 B2 | 6/2018 | Wagner et al. | |
| 10,058,896 B2 | 8/2018 | Hicham et al. | |
| 10,118,300 B2 | 11/2018 | Wagner et al. | |
| 10,315,315 B2 | 6/2019 | Wagner et al. | |
| 10,335,956 B2 | 7/2019 | Wagner et al. | |
| 2001/0038784 A1 | 11/2001 | Peltomaki | |
| 2002/0092801 A1 | 7/2002 | Dominguez | |
| 2002/0157919 A1 | 10/2002 | Sherwin | |
| 2006/0177295 A1 | 8/2006 | Frueh et al. | |
| 2008/0046116 A1 | 2/2008 | Khan et al. | |
| 2009/0047178 A1 | 2/2009 | Chojnacki et al. | |
| 2011/0243707 A1 | 10/2011 | Dumas et al. | |
| 2012/0118699 A1 | 5/2012 | Buchmann et al. | |
| 2013/0110280 A1 | 5/2013 | Folk | |
| 2014/0244026 A1 * | 8/2014 | Neiser | B65G 1/1378 700/216 |
| 2015/0081090 A1 * | 3/2015 | Dong | G06T 19/20 700/230 |
| 2015/0098775 A1 | 4/2015 | Razumov | |
| 2016/0075521 A1 | 3/2016 | Puchwein et al. | |
| 2016/0136816 A1 | 5/2016 | Pistorino | |
| 2016/0167227 A1 * | 6/2016 | Wellman | B25J 9/1612 700/259 |
| 2016/0244262 A1 | 8/2016 | O'Brien et al. | |
| 2016/0347545 A1 | 12/2016 | Lindbo et al. | |
| 2017/0021499 A1 | 1/2017 | Wellman et al. | |
| 2017/0043953 A1 | 2/2017 | Battles et al. | |
| 2017/0057091 A1 | 3/2017 | Wagner et al. | |
| 2017/0080566 A1 | 3/2017 | Stubbs et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0087731 A1 | 3/2017 | Wagner et al. | |
| 2017/0106532 A1 | 4/2017 | Wellman et al. | |
| 2017/0120455 A1 | 5/2017 | Wagner et al. | |
| 2017/0121113 A1 | 5/2017 | Wagner et al. | |
| 2017/0121114 A1 * | 5/2017 | Einav | B65D 21/0235 |
| 2017/0136632 A1 | 5/2017 | Wagner et al. | |
| 2017/0157648 A1 | 6/2017 | Wagner et al. | |
| 2017/0197316 A1 | 7/2017 | Wagner et al. | |
| 2017/0225330 A1 | 8/2017 | Wagner et al. | |
| 2017/0322561 A1 * | 11/2017 | Stiernagle | B65G 1/04 |
| 2018/0056333 A1 | 3/2018 | Hicham et al. | |
| 2018/0057264 A1 * | 3/2018 | Wicks | G06Q 10/087 |
| 2018/0127219 A1 | 5/2018 | Wagner et al. | |
| 2018/0146618 A1 * | 5/2018 | Elazary | G05D 1/0246 |
| 2018/0148272 A1 | 5/2018 | Wagner et al. | |
| 2018/0244473 A1 | 8/2018 | Mathi et al. | |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |
| 2018/0333749 A1 | 11/2018 | Wagner et al. | |
| 2019/0001505 A1 | 1/2019 | Wagner et al. | |
| 2019/0329979 A1 * | 10/2019 | Wicks | G06Q 10/087 |

FOREIGN PATENT DOCUMENTS

| | | | | |
|---|---|---|---|---|
| DE | 19857282 A1 | 6/2000 | | |
| DE | 20011842 U1 | 3/2001 | | |
| EP | 0235488 A1 | 9/1987 | | |
| EP | 0613841 A1 | 3/2001 | | |
| EP | 2233400 A1 | 9/2010 | | |
| EP | 2650237 A1 * | 10/2013 | ........... | B65G 1/1378 |
| EP | 2650237 A1 | 10/2013 | | |
| EP | 2745982 A2 | 6/2014 | | |
| EP | 2937299 A1 | 10/2015 | | |
| JP | 2000238906 A | 9/2000 | | |
| JP | 2007182286 A | 7/2007 | | |
| JP | 2007182286 A | 7/2007 | | |
| JP | 2008037567 A | 2/2008 | | |
| JP | 2014141313 A | 8/2014 | | |
| WO | 03095339 A1 | 11/2003 | | |
| WO | 2011038442 A2 | 4/2011 | | |
| WO | 2012127102 A1 | 9/2012 | | |
| WO | 2014166650 A1 | 10/2014 | | |
| WO | 2015118171 A1 | 8/2015 | | |
| WO | 2016198565 A1 | 12/2016 | | |

OTHER PUBLICATIONS

International Preliminary Report on Patentability issued by the International Bureau of WIPO dated Sep. 24, 2019 in related International Application No. PCT/US2018/024055, 7 pages.
Communication pursuant to Rules 161(1) and 162 EPC issued by the European Patent Office dated Oct. 30, 2019 in related European Patent Application No. 18718030.2, 3 pages.
Notice of First Office Action and First Office Action, along with its English Translation, issued by the China National Intellectual Property Administration in related Chinese Patent Application No. 201880020453.7 dated Sep. 16, 2020, 21 pages.

(56) References Cited

OTHER PUBLICATIONS

Examiner's Report issued by the Innovation, Sciences and Economic Development Canada in related Canadian Patent Application No. 3,057,323 dated Nov. 26, 2020, 4 pages.

* cited by examiner

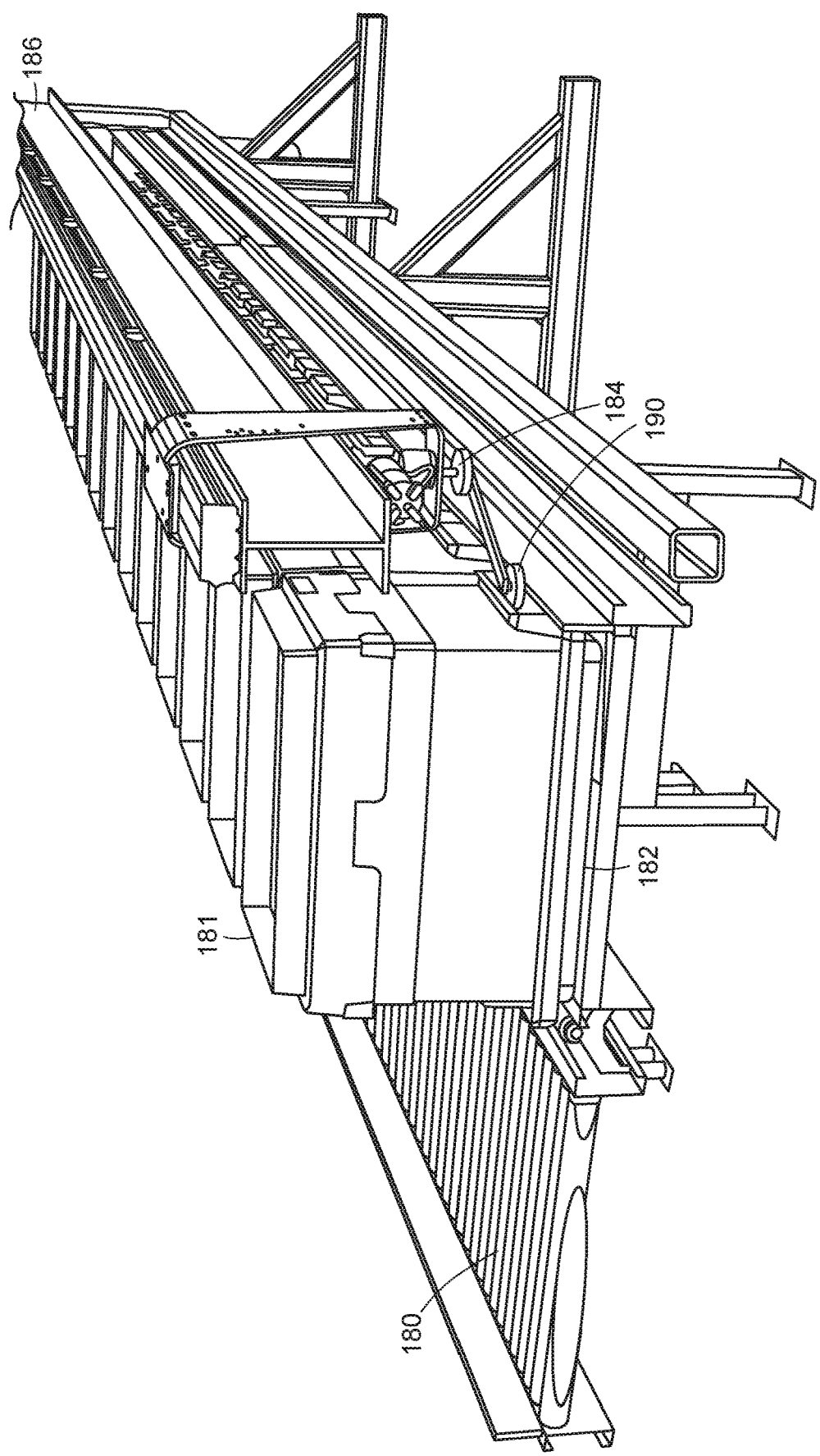

SYSTEMS AND METHODS FOR PROCESSING OBJECTS, INCLUDING AUTOMATED LINEAR PROCESSING STATIONS

PRIORITY

The present application claims priority to U.S. Provisional Patent Application Ser. No. 62/475,421 filed Mar. 23, 2017, the disclosure of which is hereby incorporated by reference in its entirety.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, consumer products etc.) be processed and moved to a number of processing destinations.

Many object distribution systems, for example, receive objects in a disorganized stream or bulk transfer that may be provided as individual objects or objects aggregated in groups such as in bags, arriving on any of several different conveyances, commonly a conveyor, a truck, a pallet a Gaylord, or a bin etc. Each object must then be distributed to the correct destination location (e.g., a container) as determined by identification information associated with the object, which is commonly determined by a label printed on the object. The destination location may take many forms, such as a bag, a shelf, a container, or a bin.

The processing (e.g., sortation or distribution) of such objects has traditionally been done, at least in part, by human workers that scan the objects, for example with a hand-held barcode scanner, and then place the objects at assigned locations. Many order fulfillment operations, for example, achieve high efficiency by employing a process called wave picking. In wave picking, orders are picked from warehouse shelves and placed at locations (e.g., into bins) containing multiple orders that are sorted downstream. At the sorting stage, individual articles are identified, and multi-article orders are consolidated, for example, into a single bin or shelf location, so that they may be packed and then shipped to customers. The process of sorting these articles has traditionally been done by hand. A human sorter picks an article, and then places the article in the so-determined bin or shelf location where all articles for that order or manifest have been defined to belong. Automated systems for order fulfillment have also been proposed. See, for example, U.S. Patent Application Publication No. 2014/0244026, which discloses the use of a robotic arm together with an arcuate structure that is movable to within reach of the robotic arm.

The identification of objects by code scanning generally either require manual processing, or require that the code location be controlled or constrained so that a fixed or robot-held code scanner (e.g., a barcode scanner) can reliably detect the code. Manually operated barcode scanners are therefore generally either fixed or handheld systems. With fixed systems, such as those at point-of-sale systems, the operator holds the article and places it in front of the scanner, which scans continuously, and decodes any barcodes that it can detect. If the article's code is not immediately detected, the person holding the article typically needs to vary the position or orientation of the article with respect to the fixed scanner, so as to render the barcode more visible to the scanner. For handheld systems, the person operating the scanner may look at the barcode on the article, and then hold the article such that the barcode is within the viewing range of the scanner, and then press a button on the handheld scanner to initiate a scan of the barcode.

Further, many distribution center sorting systems generally assume an inflexible sequence of operation whereby a disorganized stream of input objects is provided (by a human) as a singulated stream of objects that are oriented with respect to a scanner that identifies the objects. An induction element or elements (e.g., a conveyor, a tilt tray, or manually movable bins) transport the objects to desired destination locations or further processing stations, which may be a bin, a chute, a bag or a conveyor etc.

In conventional object sortation or distribution systems, human workers or automated systems typically retrieve object sin an arrival order, and sort each object or object into a collection bin based on a set of given heuristics. For example, all objects of a like type might be directed to a particular collection bin, or all objects in a single customer order, or all objects destined for the same shipping destination, etc. may be directed to a common destination location. Generally, the human workers, with the possible limited assistance of automated systems, are required to receive objects and to move each to their assigned collection bin. If the number of different types of input (received) objects is large, then a large number of collection bins is required.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store (as shown at 24), and a second set of break-pack store packages may go to a second store (as shown at 26). In this way, the system may accept large volumes of product from a manufacturer, and then re-package the objects into break-packs to be provided to retail stores at which a wide variety of objects are to be provided in a specific controlled distribution fashion.

Such a system however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely in human labor to some extent. Most solutions rely on a worker that is performing sortation, by scanning each object from an induction area (chute, table, etc.) and placing each object at a staging location, conveyor, or collection bin.

When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a method of processing objects using a programmable motion device. The method includes the steps of perceiving identifying indicia representative of an identity of a plurality of objects and directing the plurality of objects toward an input area from at least one input conveyance system, acquiring an object from the plurality of objects at the input area using an end effector of the programmable motion device, and moving the acquired object toward an identified processing location using the programmable motion device. The identified processing location is associated with the identifying indicia and the identified processing location is provided as one of a plurality of processing locations along a first direction. The step of moving the acquired object includes moving the programmable motion device along a second direction that is substantially parallel with the first direction.

In accordance with another embodiment, the invention provides a method of processing objects using a programmable motion device, wherein the method includes the steps of perceiving identifying indicia representative of an identity of a plurality of objects, acquiring an object from the plurality of objects at an input area using an end effector of the programmable motion device and moving the acquired object toward an identified processing location using the programmable motion device, said identified processing location beings associated with the identifying indicia and said identified processing location being provided as one of a plurality of processing locations that extend along a first direction. The step of moving the acquired object includes moving the programmable motion device along a second direction that is substantially parallel with the first direction.

In accordance with a further embodiment, the invention provides a processing system for processing objects using a programmable motion device. The processing system includes a perception unit for perceiving identifying indicia representative of an identity of a plurality of objects associated with an input conveyance system, and an acquisition system for acquiring an object from the plurality of objects at the input area using an end effector of the programmable motion device. The programmable motion device for moving the acquired object toward an identified processing location. The identified processing location is associated with the identifying indicia and the identified processing location is provided as one of a plurality of processing locations that extend along a first direction. The programmable motion device is movable along a second direction that is substantially parallel with the first direction.

BRIEF DESCRIPTION OF THE DRAWINGS

The following description may be further understood with reference to the accompanying drawings in which:

FIGS. 14A-14D show illustrative diagrammatic views of a bin removal system for use in a system in accordance with an embodiment of the present invention;

The drawings are shown for illustrative purposes only.

DETAILED DESCRIPTION

In accordance with an embodiment, the invention provides a method of processing objects using a programmable motion device. The method includes the steps of perceiving identifying indicia representative of an identity of a plurality of objects and directing the plurality of objects toward an input area from at least one input conveyance system, acquiring an object from the plurality of objects at the input area using an end effector of the programmable motion device, and moving the acquired object toward an identified processing location using the programmable motion device, said identified processing location beings associated with the identifying indicia and said identified processing location being provided as one of a plurality of processing locations along a first direction, and said step of moving the acquired object including moving the programmable motion device along a second direction that is substantially parallel with the first direction.

Generally, objects need to be identified and conveyed to desired object specific locations. The systems reliably automate the identification and conveyance of such objects, employing in certain embodiments, a set of conveyors, a perception system, and a plurality of destination bins. In short, applicants have discovered that when automating sortation of objects, there are a few main things to consider: 1) the overall system throughput (objects sorted per hour), 2) the number of diverts (i.e., number of discrete locations to which an object can be routed), 3) the total area of the sortation system (square feet), and 4) the capital and annual costs to purchase and run the system.

Processing objects in a break-pack distribution center is one application for automatically identifying and processing objects. As noted above, in a break-pack distribution center, objects commonly arrive in trucks, are conveyed to sortation stations where they are sorted according to desired destinations into boxes (or packages) that are then loaded in trucks for transport to, for example, shipping or distribution centers or retail stores. In a shipping or distribution center, the desired destination is commonly obtained by reading identifying information printed on the box or package. In this scenario, the destination corresponding to identifying information is commonly obtained by querying the customer's information system. In other scenarios, the destination may be written directly on the box, or may be known through other means such as by assignment to a vendor bin.

The system also requests specific bins of objects from a storage system, which helps optimize the process of having desired objects be delivered to specific singulator cells in an efficient way without simply letting all bins of objects appear at each singulator cell in a purely random order.

Figure 1:
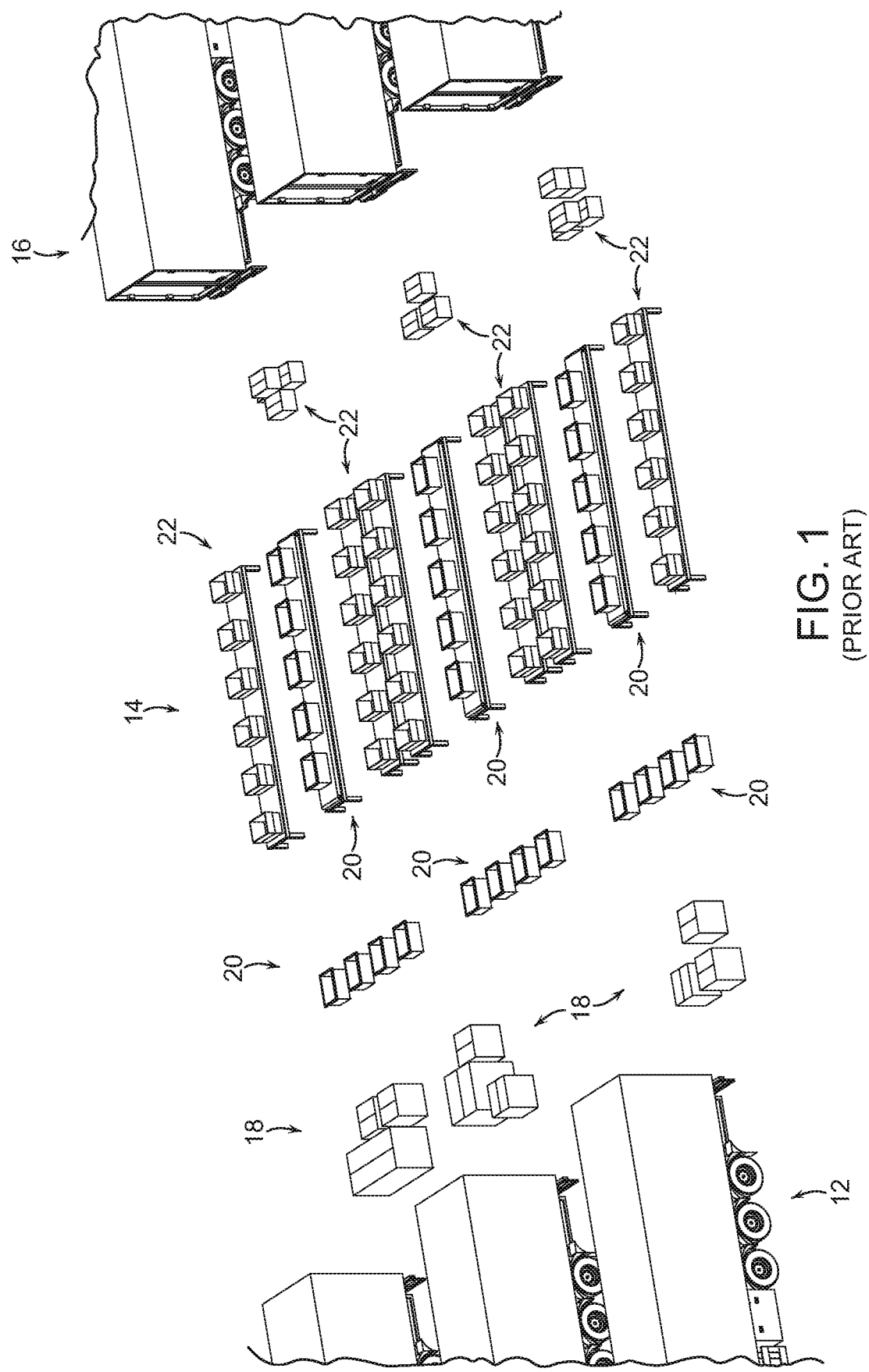
FIG. 1 shows an illustrative diagrammatic view of an object processing system of the prior art.
Figure 2:
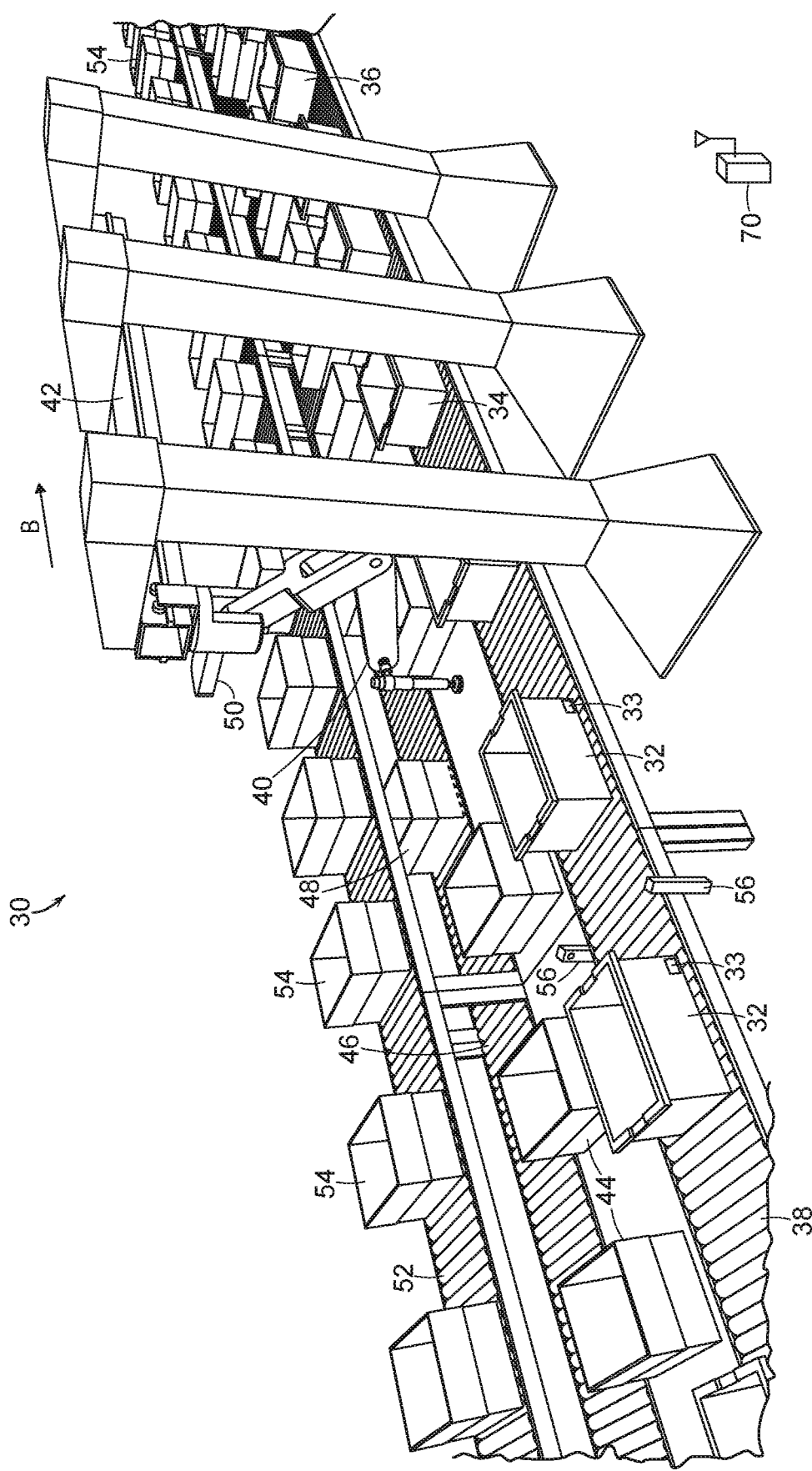
FIG. 2 shows an illustrative diagrammatic view of an object processing system in accordance with an embodiment of the present invention.

FIG. 2, for example, shows a system 30 in accordance with an embodiment of the present invention that receives decanted vendor bins, e.g., 32, 34, 36 on an in-feed conveyor 38. A programmable motion device such as an articulated arm 40 having an end effector is provided suspended from and movable along a linear gantry 42. Adjacent the base of the articulated arm and also suspended from the linear gantry 42 is a perception unit 50 (as further discussed below with reference to FIG. 3. Additional perception units 56 may be provided (for example, near vendor bin in-feed conveyor 38) that capture perception information regarding a label that is applied to each bin e.g., 32, 34, 36 that associates the bin with the contents of the bin.

The articulated arm is programmed to access each of the vendor bins 32, 34, 36, and to move (including movement along the gantry) to bring any of the objects in bins 32, 34, 36 to one of a plurality of break-pack packages 44 at a plurality of processing locations. When a package 44 is complete, the articulated arm 40 will move (push) the completed box onto an output conveyor 46 on which completed boxes 48 are provided. The completed boxes may be sealed and labeled at the processing station 30, or may be sealed and labeled at a later station. An additional conveyor 52 may be provided that provides empty boxes 54 to within access of the articulated arm 40. After a completed box is removed from the processing location, an empty box may be grasped by the end effector of the articulated arm and placed in the processing location.

It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

The operations of the system described above are coordinated with a central control system 70 as shown in FIG. 2 that communicates wirelessly with the articulated arm 40, the perception units 56, as well as in-feed conveyor 38. The perception unit 56 captures indicia 33 on the bins that identify the content of the bins. In particular, this system determines from symbol strings the UPC associated with a vendor bin, as well as the outbound destination for each object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 3:
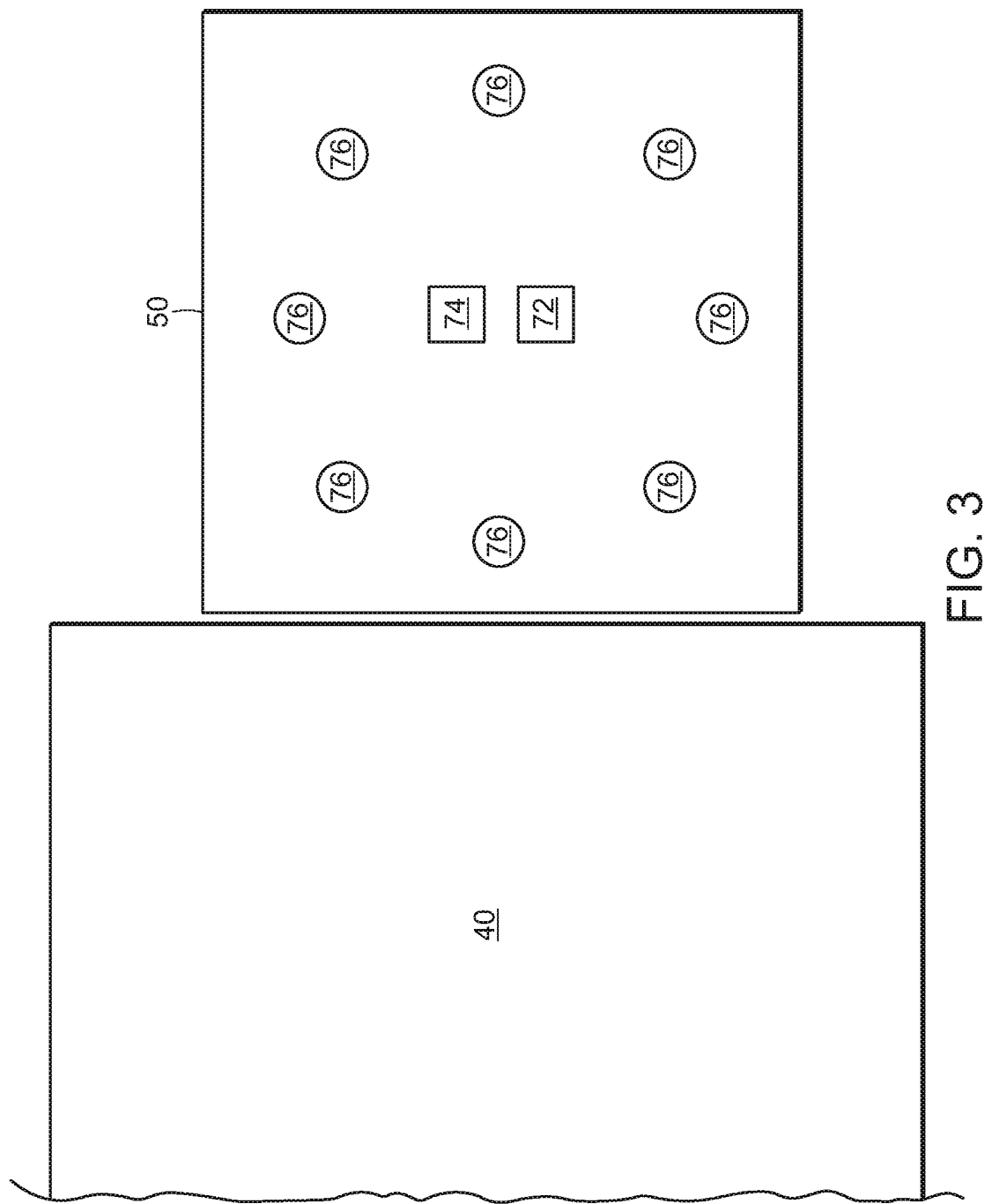
FIG. 3 shows an illustrative diagrammatic view of an underside of a perception system in the object processing system of FIG. 2.

As discussed above, the system of an embodiment includes a perception system (e.g., 50, 52) that is mounted above a bin of objects to be processed next to the base of the articulated arm 40, looking down into a bin (e.g., 32, 34, 36). The system 50, for example and as shown in FIG. 3, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 4:
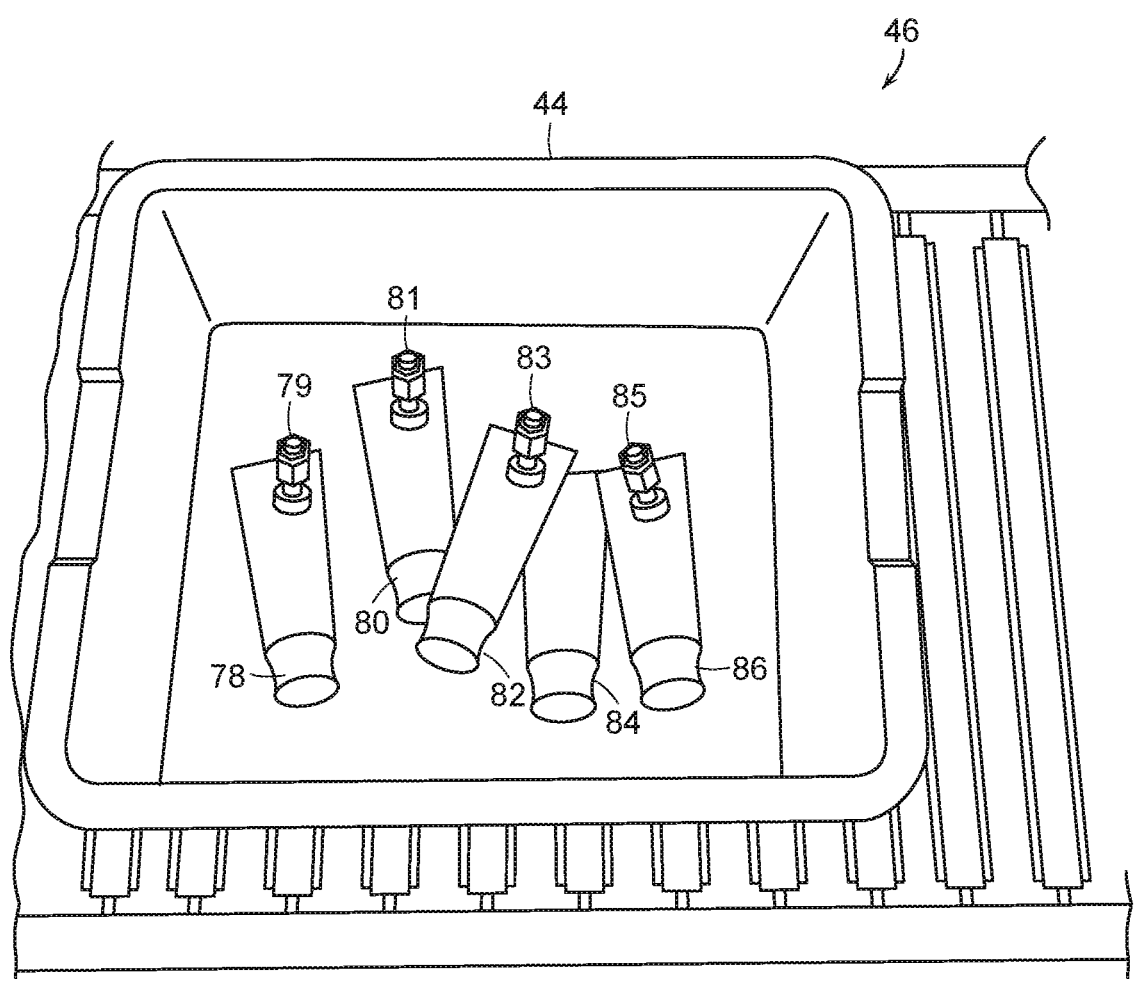
FIG. 4 shows an illustrative diagrammatic view from the perception system of FIG. 3, showing a view of objects within a bin of objects to be processed.

FIG. 4 shows an image view from the perception unit 50. The image view shows a bin 44 in an input area 46 (a conveyor), and the bin 44 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 4. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 5A:
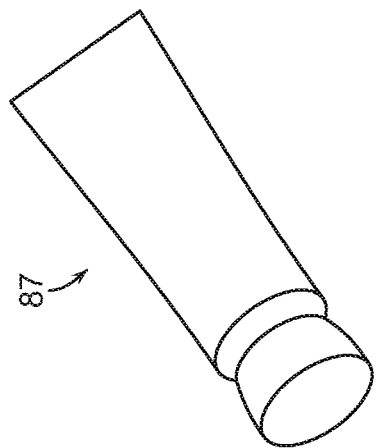
FIGS. 5A and 5B show an illustrative diagrammatic view of a grasp selection process in an object processing system of an embodiment of the present invention.
Figure 5B:
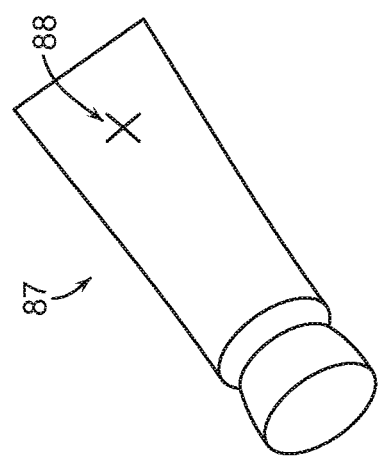

As shown in FIGS. 5A and 5B, the perception system may also identify portions of an object that are the most flat in the generation of good grasp location information. In particular, if an object includes a tubular end and a flat end such as object 87, the system would identify the more flat end as shown at 88 in FIG. 5B. Additionally, the system may select the area of an object where a UPC code appears, as such codes are often printed on a relatively flat portion of the object to facilitate scanning of the barcode.

Figure 7A:
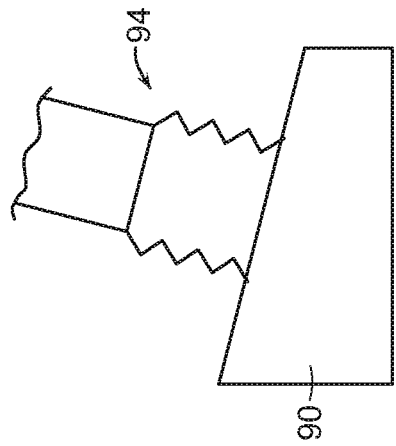
FIGS. 7A and 7B show an illustrative diagrammatic view of a grasp execution process in an object processing system of an embodiment of the present invention.
Figure 7B:
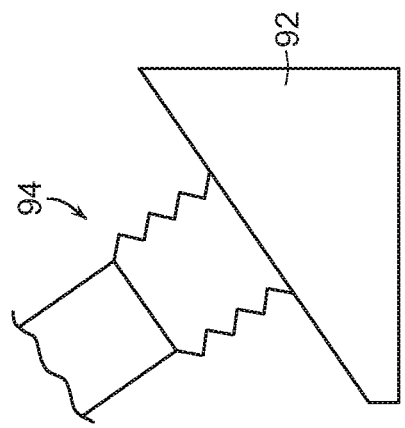
Figure 6A:
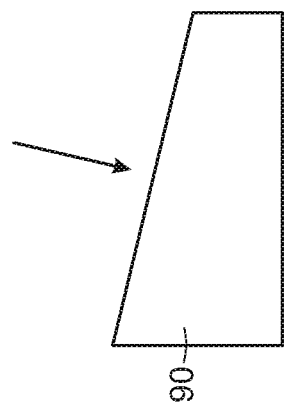
FIGS. 6A and 6B show an illustrative diagrammatic view of a grasp planning process in an object processing system of an embodiment of the present invention.
Figure 6B:
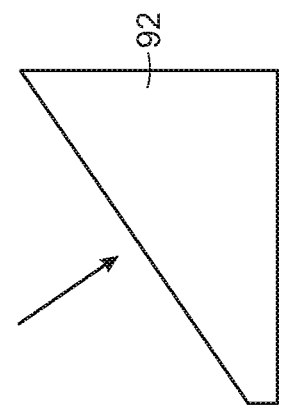

FIGS. 6A and 6B show that for each object 90, 92, the grasp selection system may determine a direction that is normal to the selected flat portion of the object 90, 92. As shown in FIGS. 7A and 7B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

In accordance with various embodiments therefore, the invention further provides a sortation system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance based features as depth sensors may not always be accurate enough to provide sufficient information about graspability. For example, the system can learn the location of fiducials such as barcodes on the object, which can be used as indicator for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

Figure 8A:
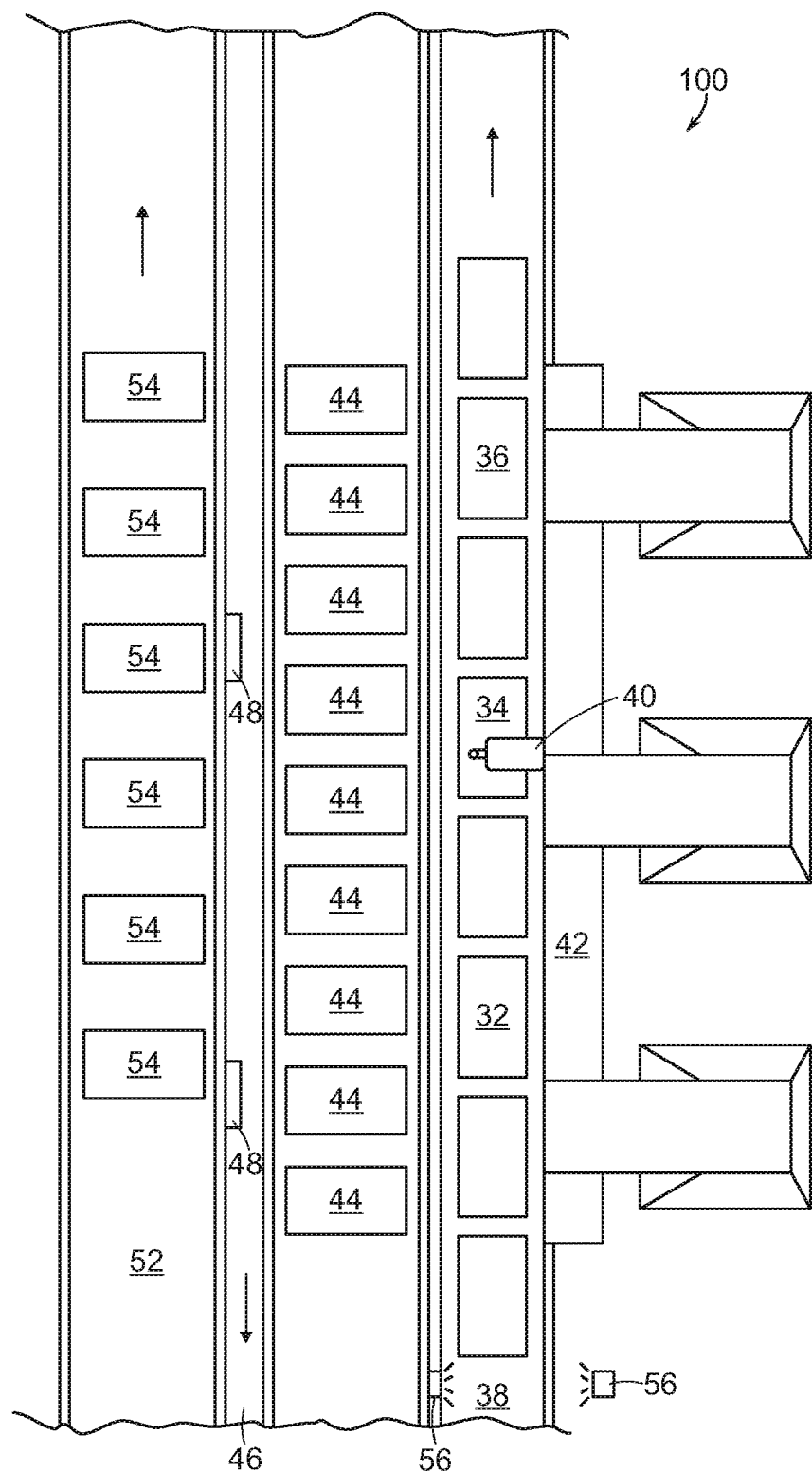
FIG. 8A shows an illustrative diagrammatic top view of a processing station in an object processing system in accordance with an embodiment of the invention.
Figure 8B:
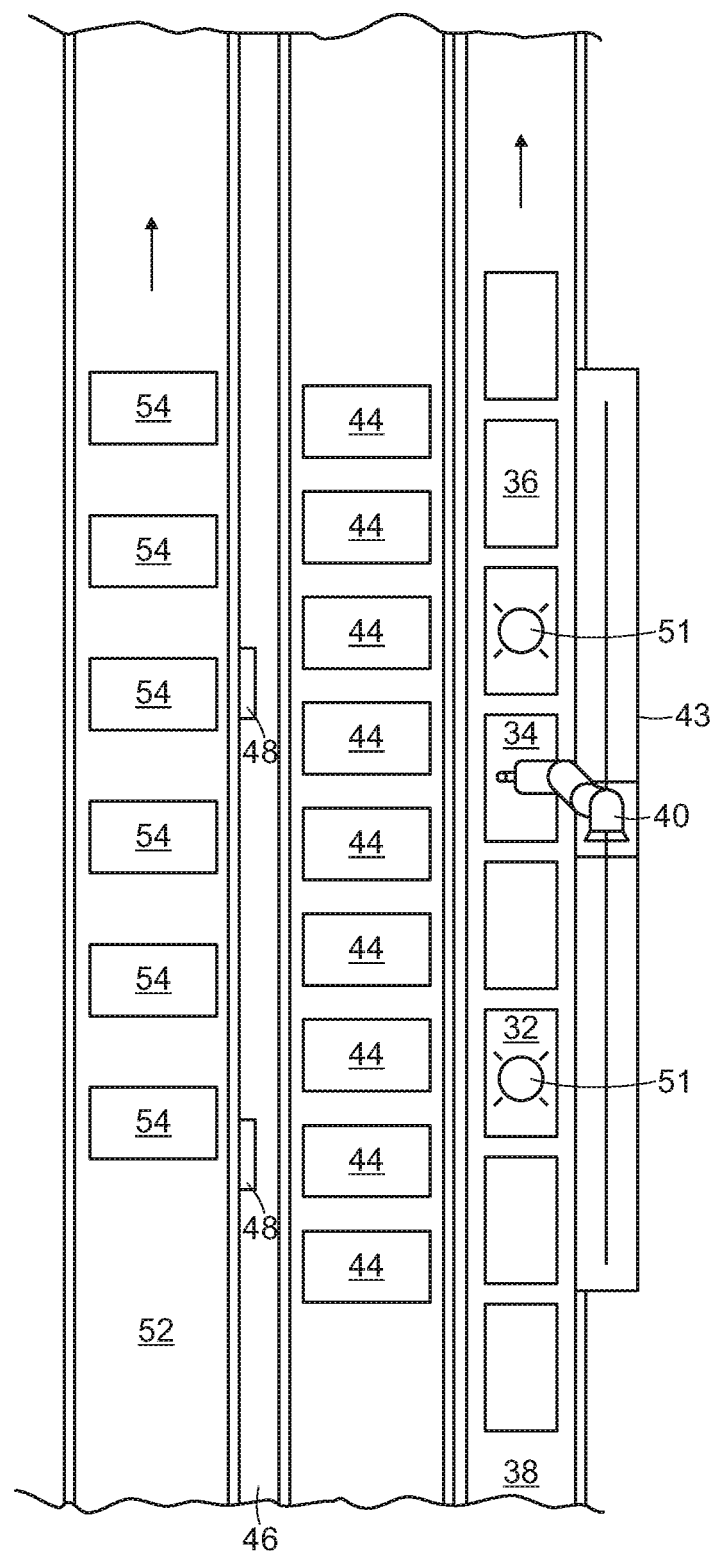
FIG. 8B shows an illustrative diagrammatic top view of a processing station in an object processing system in accordance with another embodiment of the invention involving a floor mounted programmable motion device.
Figure 9:
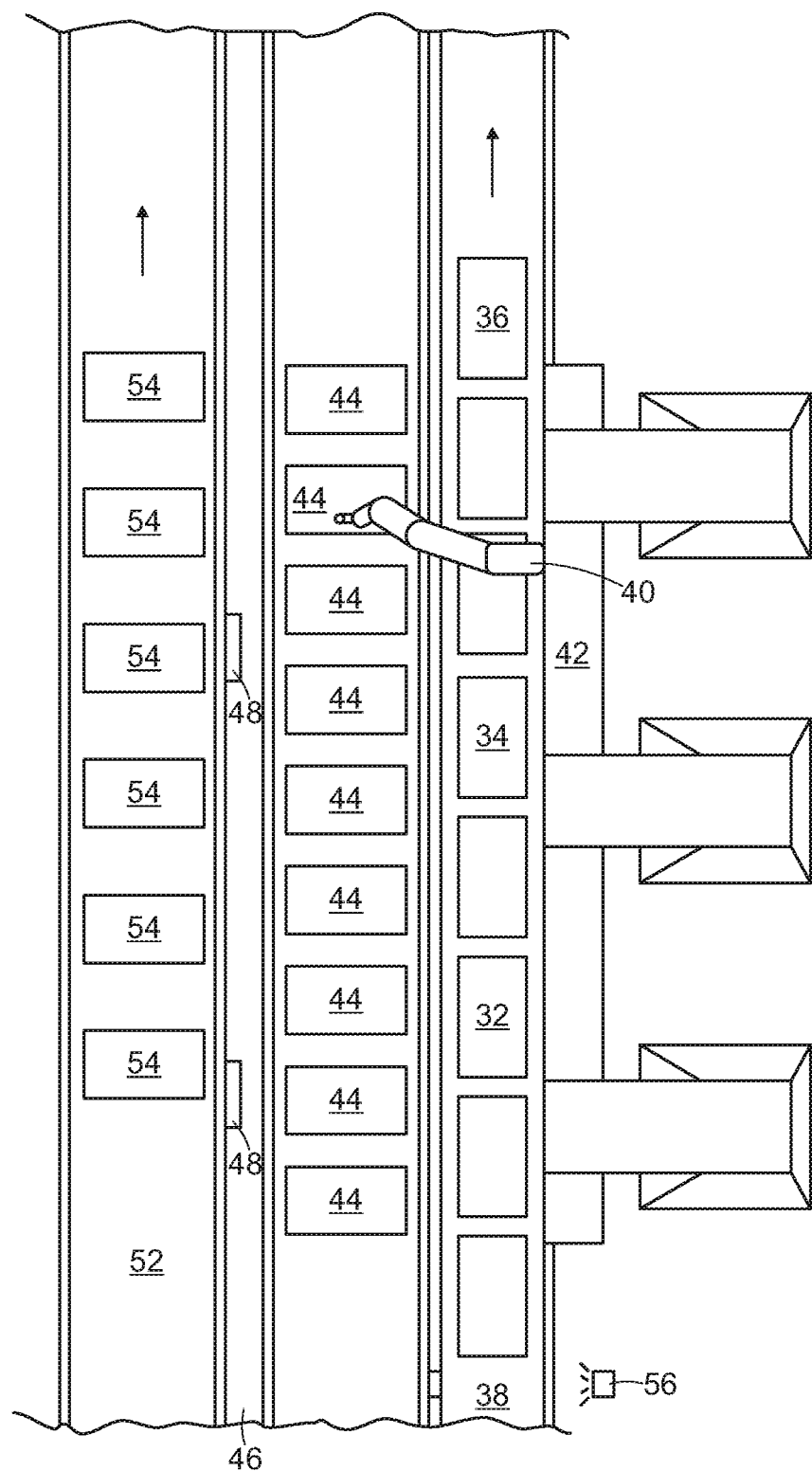
FIG. 9 shows an illustrative diagrammatic top view of the system of FIG. 8A with the programmable motion device deposing an object into a processing bin.
Figure 10:
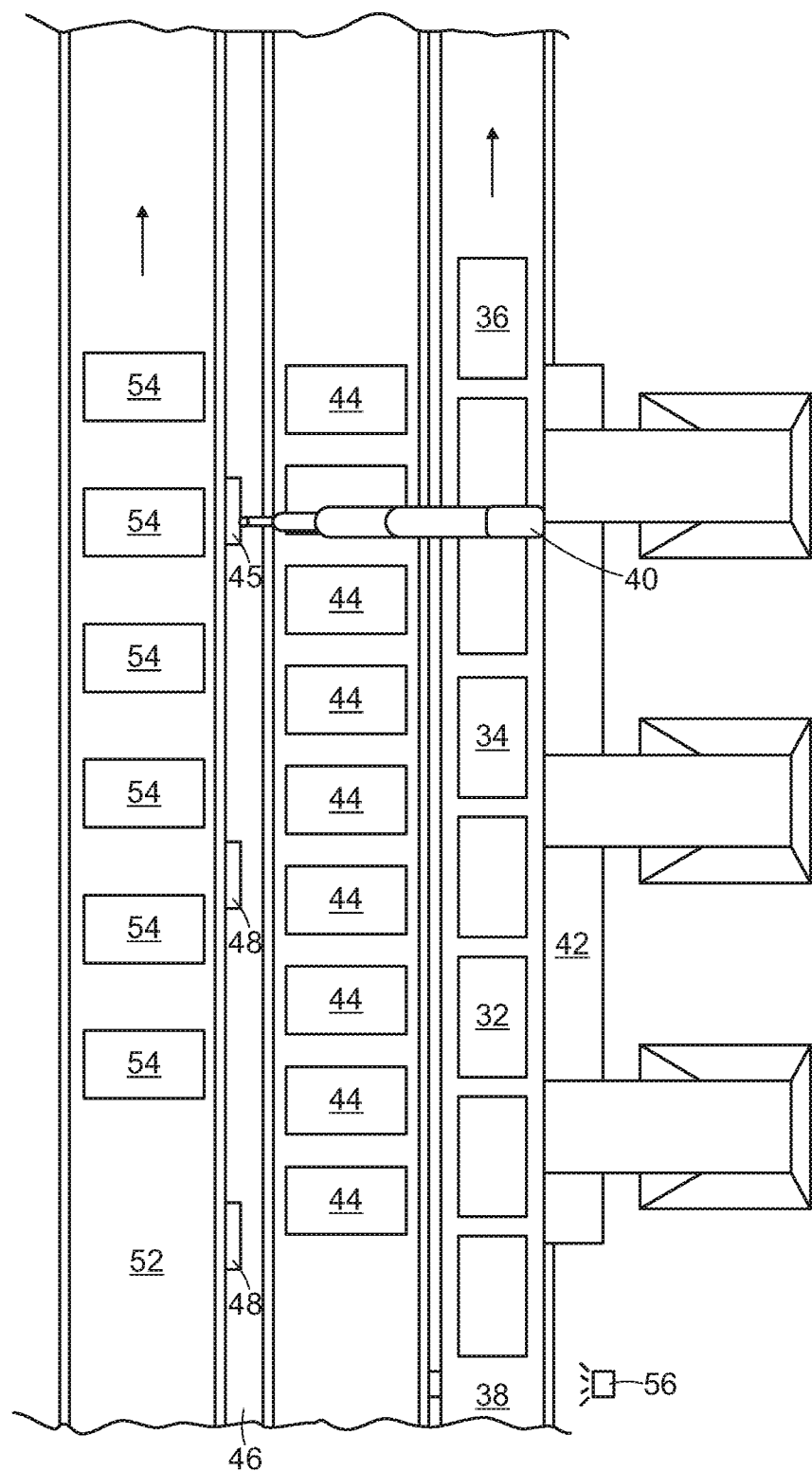
FIG. 10 shows an illustrative diagrammatic top view of the system of FIG. 8A with the programmable motion device moving a processing bin onto an outbound conveyor.
Figure 11:
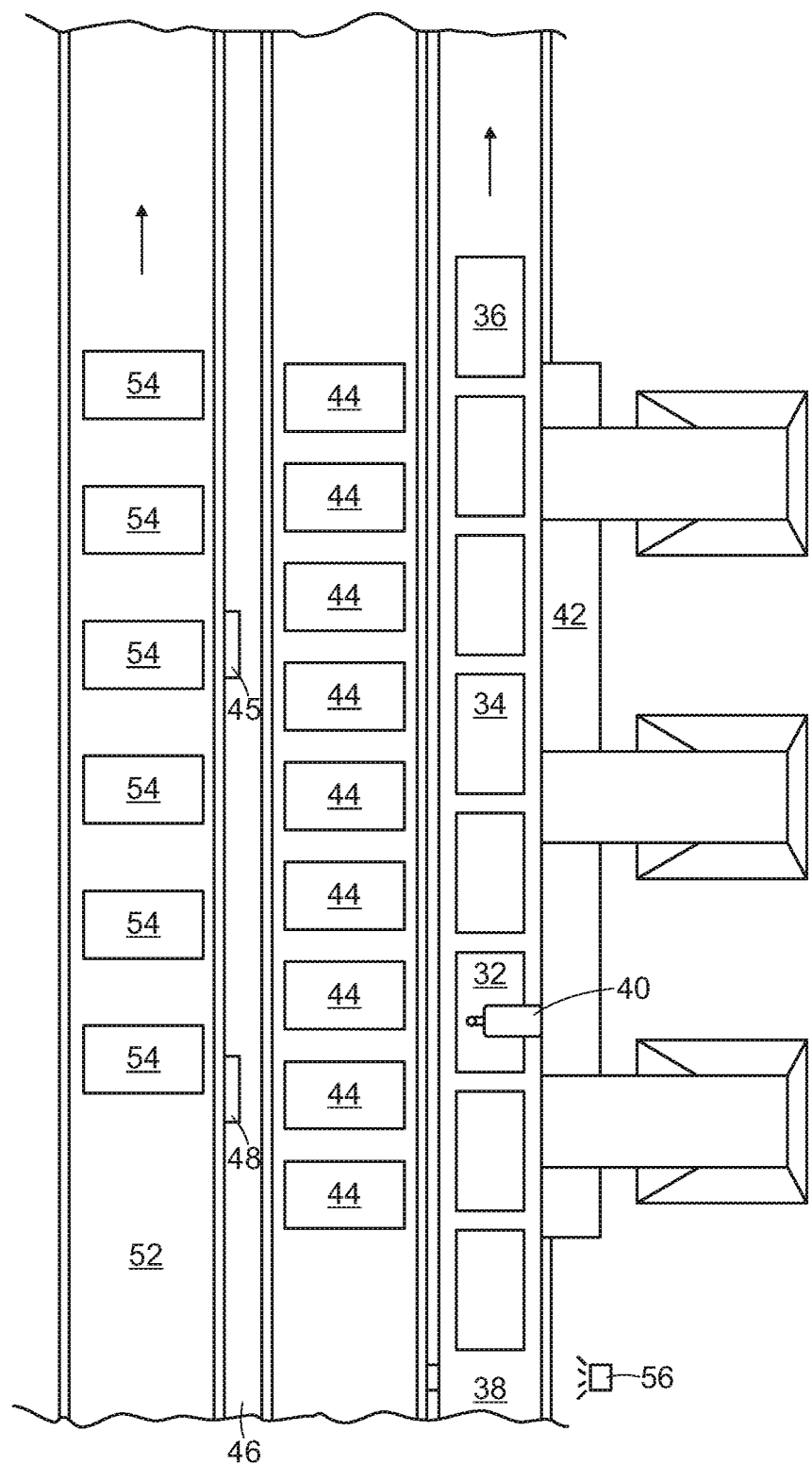
FIG. 11 shows an illustrative diagrammatic top view of the system of FIG. 8A with the programmable motion device having moved a new bin onto the processing bin conveyor.

FIG. 8A shows a diagrammatic top view of the system of FIG. 2, including the linear gantry 42 from which the articulated arm 40 and perception system 50 are suspended, the in-feed conveyor 38 including decanted vendor bins (e.g., 32, 34, 36), the break-pack packages 44, the output conveyor 46 and the empty boxes 54 on the empty box supply conveyor 52. In FIG. 8A, the articulated arm 40 is grasping an object from in-feed bin 34. The grasped object may be moved from the in-feed bin 34 to a break-pack package as shown in FIG. 9. When a break-pack package is complete, the articulated arm may push the completed package 45 onto the output conveyor 46 as shown in FIG. 10. The articulated arm 40 may then be engaged to grasp an empty box 54 from the empty box supply conveyor 52, and place it into the processing location vacated by the completed box 45 as shown in FIG. 11. The system may then continue processing the in-feed bins (e.g., 32, 34, 36). FIG. 8B shows a system similar to that of FIG. 8A, except that the linear support 43 for (and providing the linear actuation of) the articulated arm 40 is on the floor, and in the example of FIG. 8B, perception units 51 may be positioned above the in-feed conveyor 38.

The bins 44 may be provided as boxes, totes, containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 12:
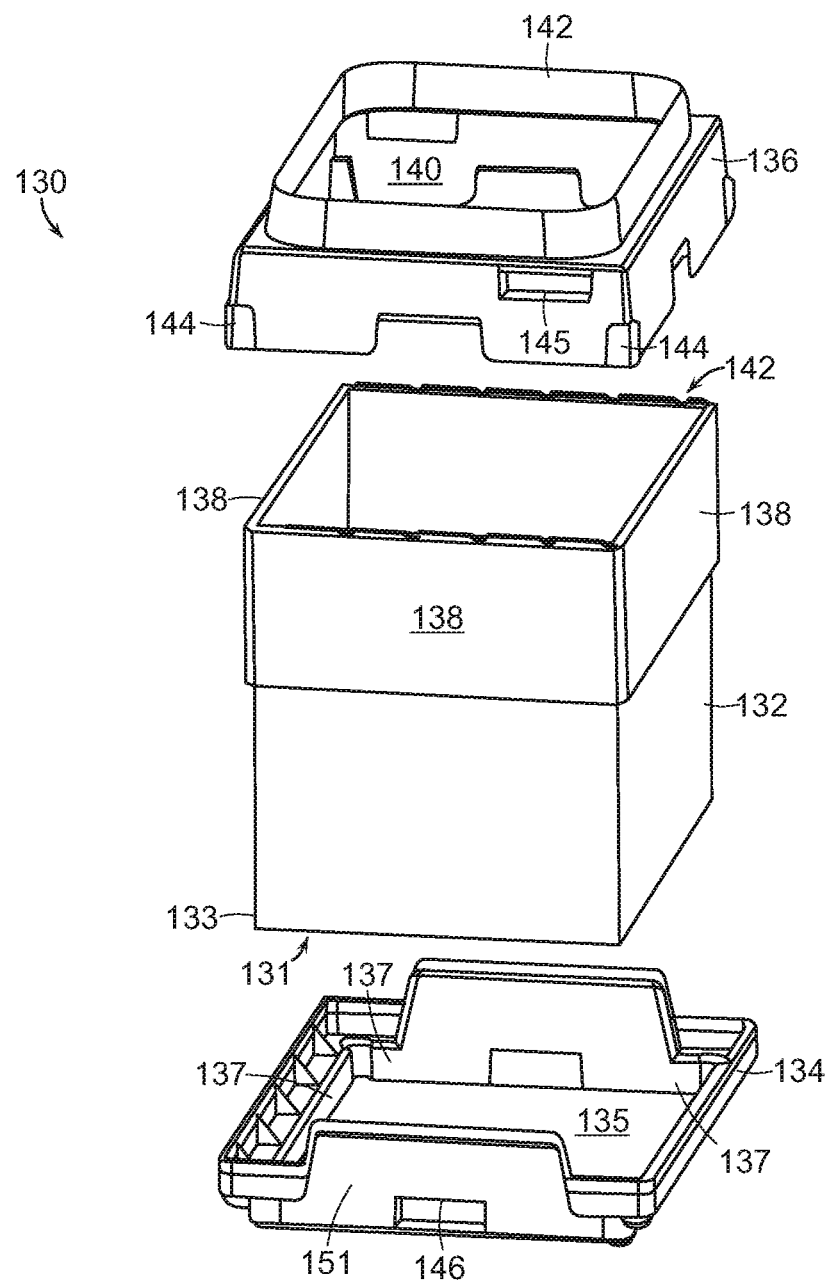
FIG. 12 shows an illustrative diagrammatic exploded view of a box tray assembly for use in a system in accordance with an embodiment of the present invention.

For example, FIG. 12 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 12, the box 132 may include top flaps 138 that, when opened as shown, are held open by inner surfaces 140 of the box cover 136. The box cover 136 may also include a recessed (protected) area in which a label or other identifying indicia 145 may be provided The box cover 136 also provides a defined rim opening 142, as well as corner elements 144 that may assist in providing structural integrity of the assembly, and may assist in stacking un-used covers on one another. Un-used box trays may also be stacked on each other.

Figure 13:
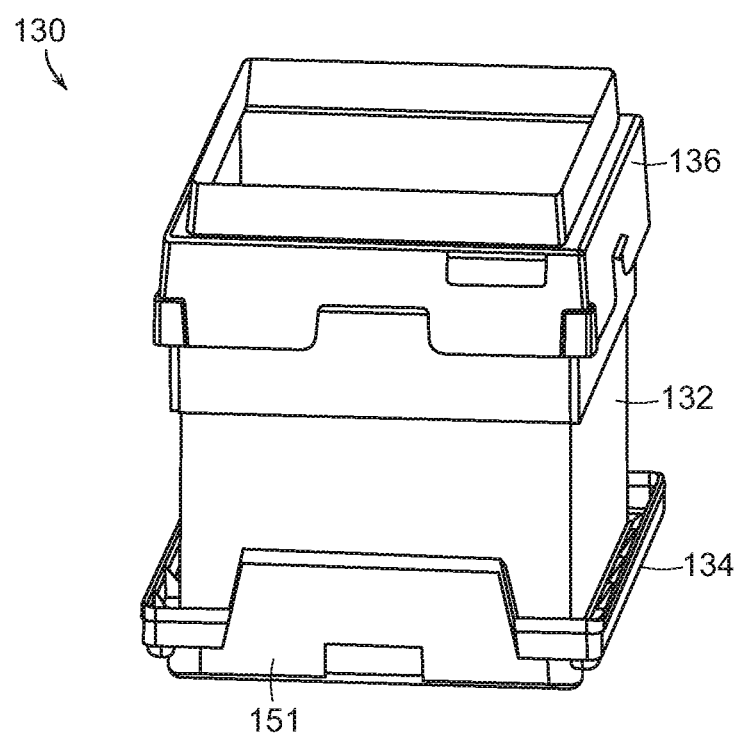
FIG. 13 shows an illustrative diagrammatic view of the box tray assembly of FIG. 12 with the components combined.

The box 132 is thus maintained securely within the box tray 134, and the box cover 136 provides that the flaps 138 remain down along the outside of the box permitting the interior of the box to be accessible through the opening 142 in the box cover 136. FIG. 13 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 14A:
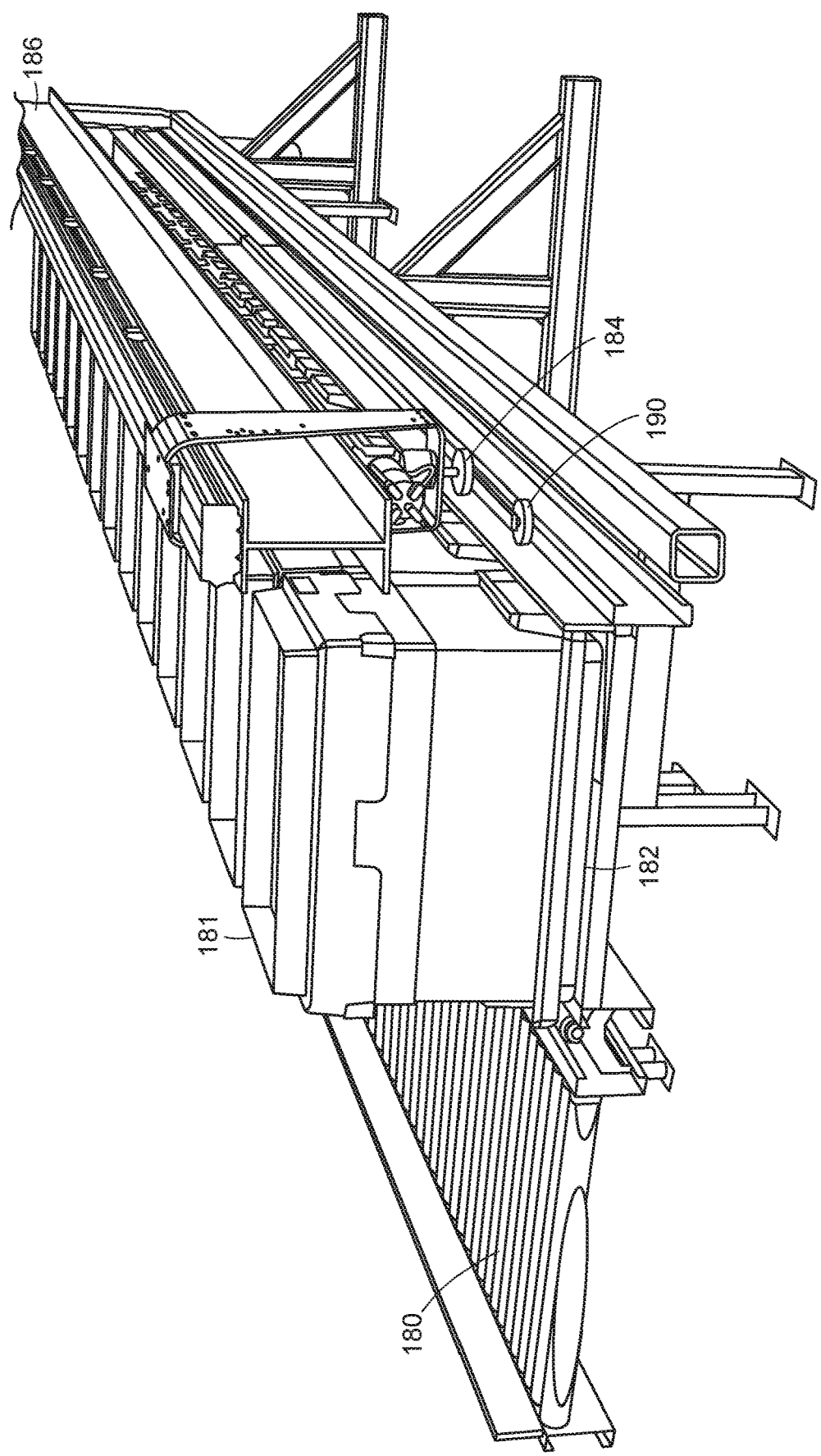
Figure 14C:
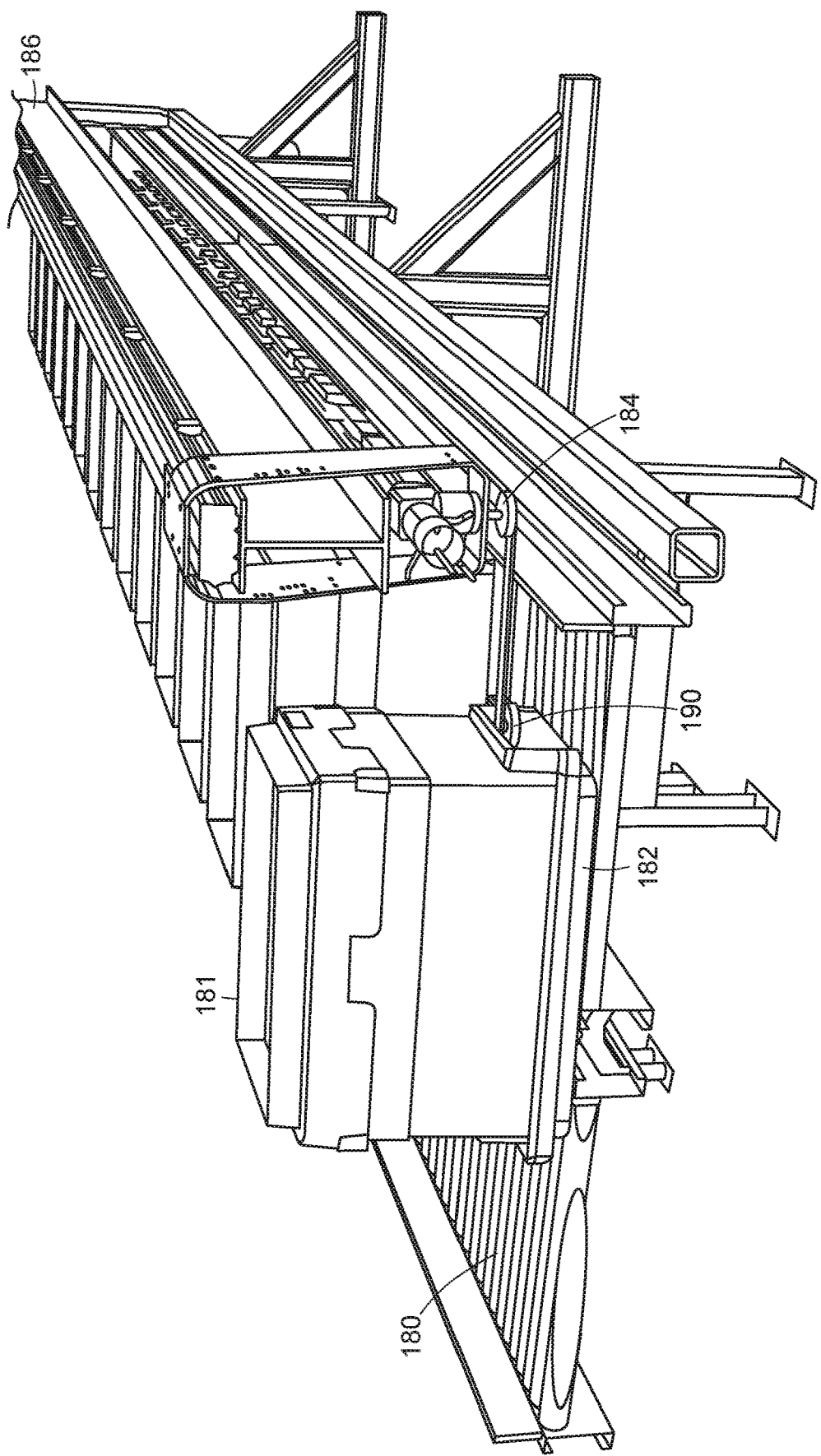
Figure 14D:
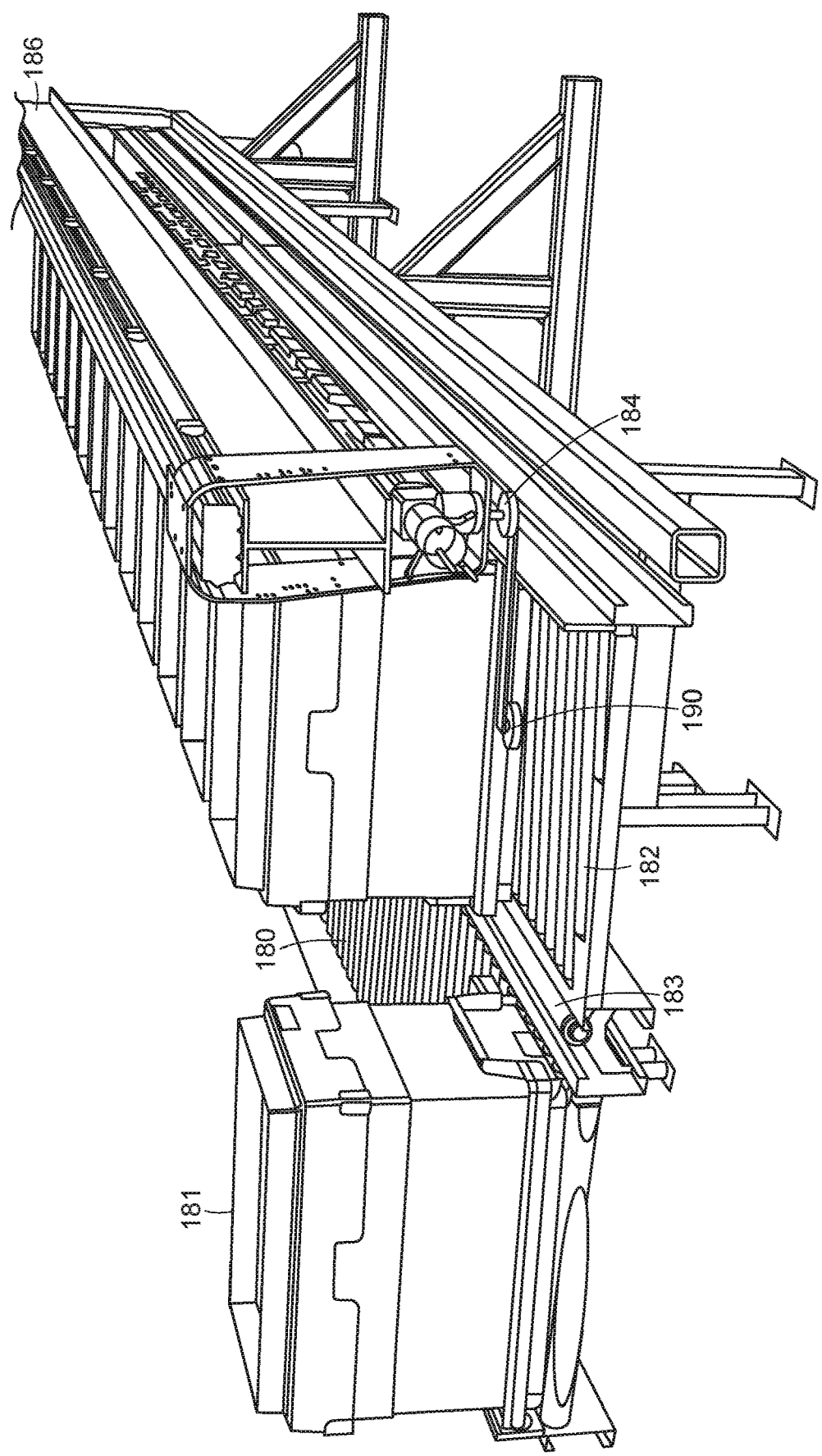

With reference to FIGS. 14A-14D, a box kicker 184 in accordance with an embodiment of the present invention may be suspended by and travel along a track 86, and may include a rotatable arm 88 and a roller wheel 190 at the end of the arm 88. With reference to FIGS. 14B-14D, when the roller wheel 190 contacts the kicker plate 151 (shown in FIG. 12) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181, e.g., by being activated to pull the box tray over to the conveyor 180.

The system of an embodiment may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

Figure 15:
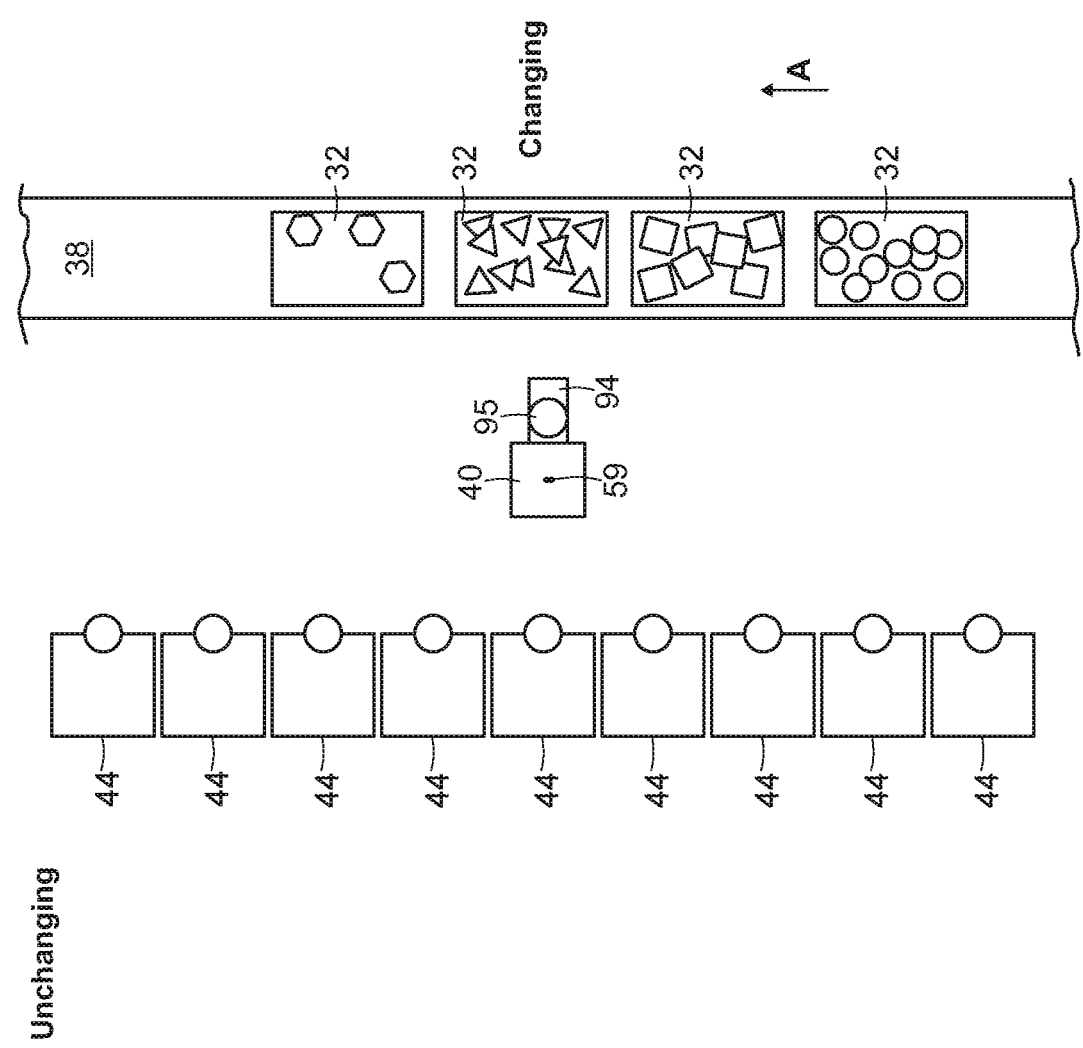
FIG. 15 shows an illustrative diagrammatic top view of an object processing system in accordance with another embodiment of the invention that identifies changing and unchanging motion planning general areas.

FIG. 15 for example, shows a diagrammatic view of a system in accordance with an embodiment of the invention that includes an input area conveyor 38 (moving in a direction as indicated at A) that provide input bins 32 to a programmable motion device (as shown diagrammatically at 40), such as an articulated arm, having a base as shown at 59, and an end effector (shown diagrammatically at 94) that is programmed to have a home position (shown at 95), and is programmed for moving objects from an input bin (e.g., 32) to processing locations, e.g., destination locations at the plurality of sets of boxes 44. Again, the system may include a defined home or base location 95 to which each object may initially be brought upon acquisition from the bin (e.g., 32). The programmable motion device 40, as seen in FIG. 2, is mounted on the gantry 42 and is movable in directions as indicated at B while the articulated arm may also be moving.

In certain embodiments, the system may include a plurality of base locations, as well as a plurality of predetermined path portions associated with the plurality of base locations. The trajectories taken by the articulated arm of the robot system from the input bin to the base location are constantly changing based in part, on the location of each object in the input bin, the orientation of the object in the input bin, and the shape, weight and other physical properties of the object to be acquired.

Once the articulated arm has acquired an object and is positioned at the base location, the paths to each of the plurality of destination bins 44 are not changing. In particular, each destination bin is associated with a unique destination bin location, and the trajectories from the base location to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base locations and destination bin locations.

Figure 16:
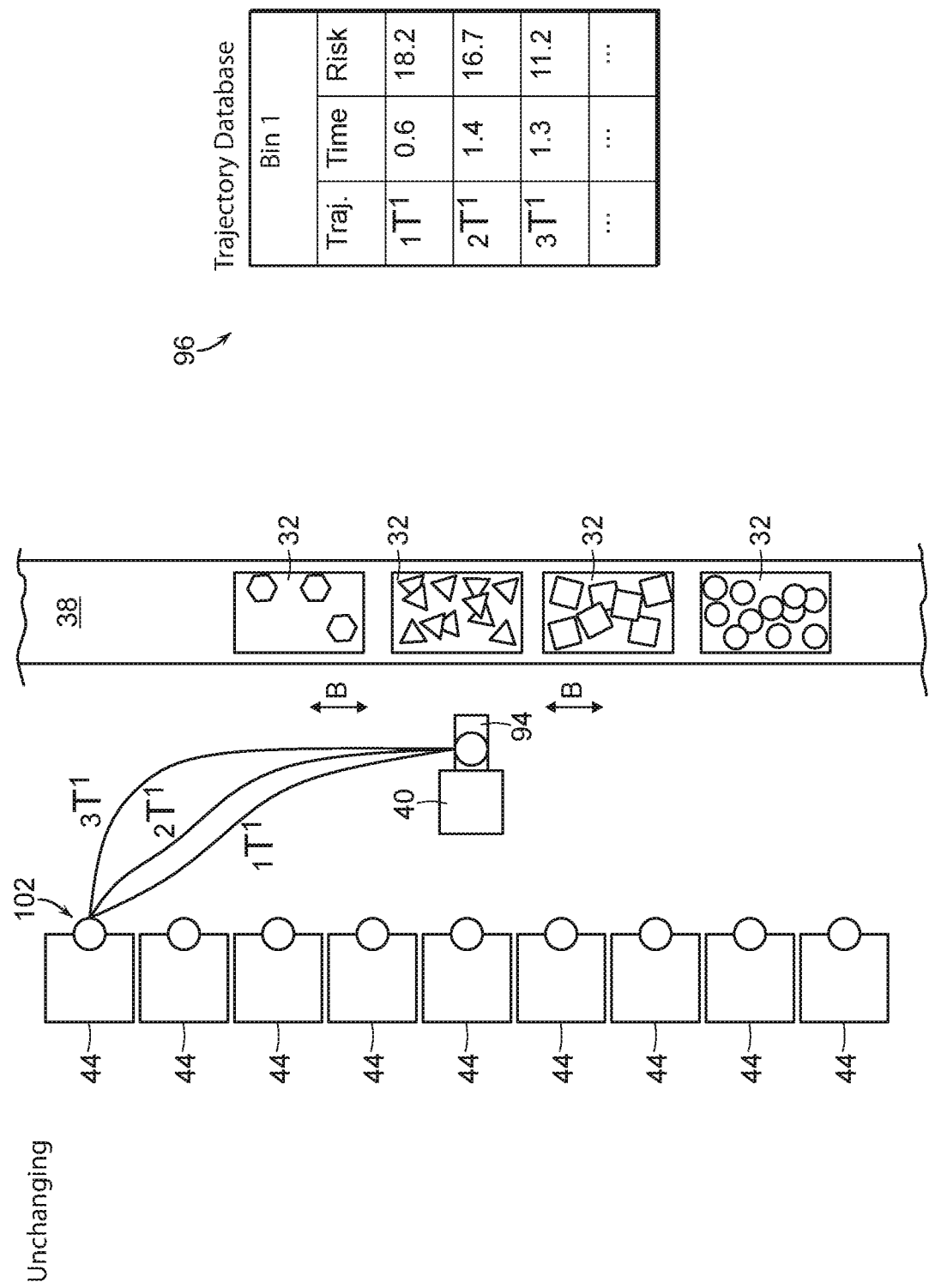
FIG. 16 shows an illustrative diagrammatic top view of the system of FIG. 15, showing multiple possible paths from the programmable motion device to a destination carrier.

FIG. 16 for example, shows three such trajectories ($_1T^1$, $_2T^1$ and $_3T^1$) between base location 95 and a destination bin location 102. The elements of FIG. 13 are the same as those of FIG. 12. Each trajectory will have an associated time as well as an associated risk factor. The time is the time it takes for the articulated arm of the robotic system to accelerate from the base location 95 move toward the destination bin 102, and decelerate to the destination bin location 106 in order to place the object in the destination bin 102.

The risk factor may be determined in a number of ways including whether the trajectory includes a high (as pre-defined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 96 in FIG. 16, the trajectory $_1T^1$ from the base location 95 to the destination location 102 may have a fast time (0.6 s) but a high risk factor. The trajectory $2T^1$ from the base location 95 to the destination location 102 may have a much slower time (1.4 s) but still a fairly high risk factor (16.7). The trajectory $_3T^1$ from the base location 95 to the destination location 102 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object. Different trajectories therefore, may have different times and risk factors, and this data may be used by the system in motion planning.

Figure 17:
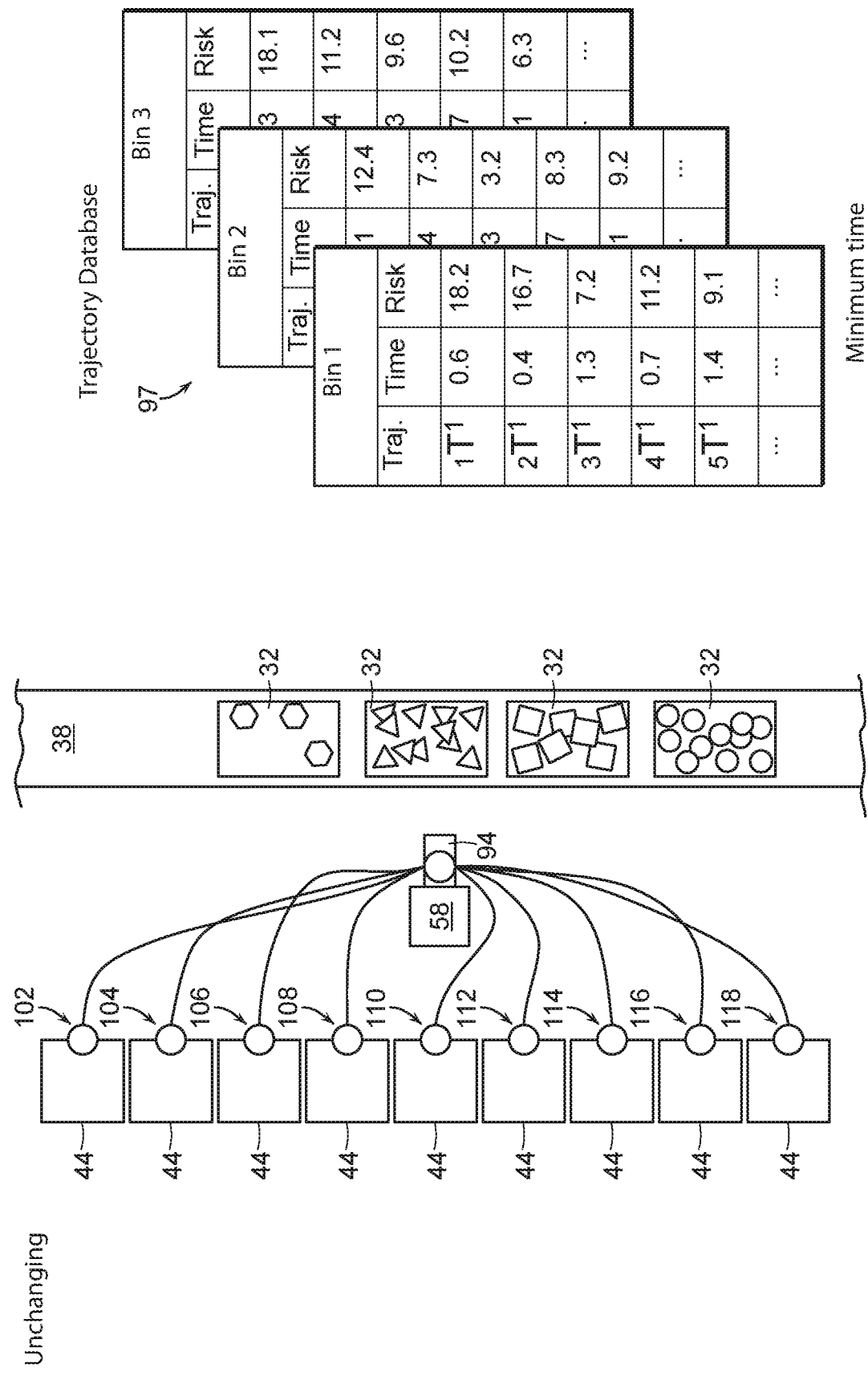
FIG. 17 shows an illustrative diagrammatic top view of the system of FIG. 15, showing paths from the programmable motion device to a destination carrier with an emphasis on minimum time.

FIG. 17, for example, shows minimum time-selected trajectories from the base location 95 to each of destination bin locations 102-118. In particular, the tables shown at 97 that the time and risk factors for a plurality of the destination bins, and the trajectories from the base location 95 to each of a plurality of the destination bin locations are chosen to provide the minimum time for motion planning for motion planning under a risk factor of 14.0.

Figure 18:
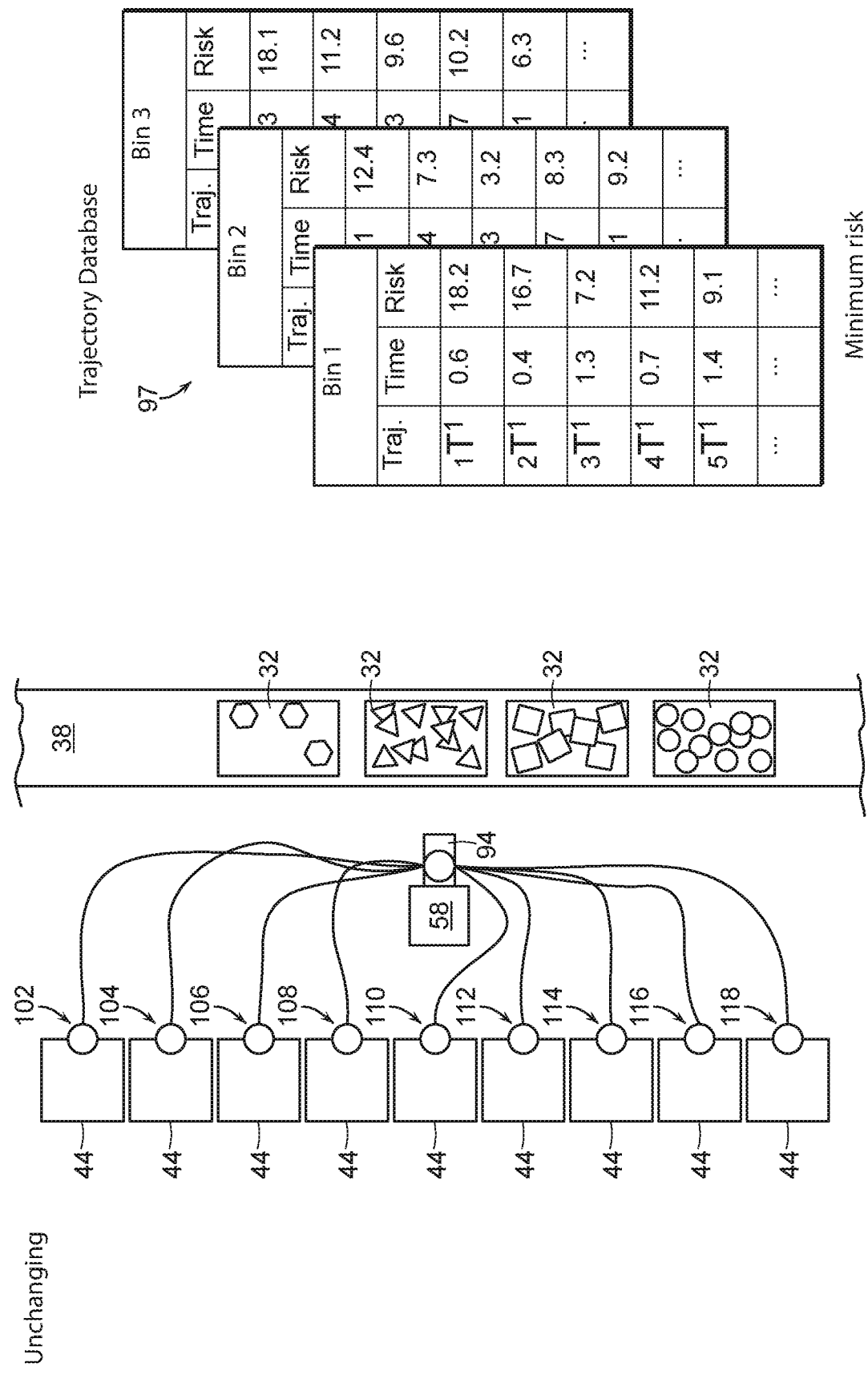
FIG. 18 shows an illustrative diagrammatic top view of the system of FIG. 15, showing paths from the programmable motion device to a destination carrier with an emphasis on minimum risk.

FIG. 18 shows minimum risk-factor-selected set of trajectories from the base location 95 to each of the destination bin locations 102-118. Again, the tables shown at 97 show the time and risk factors for the plurality of the destination bins (e.g., 1-3). The trajectories from the base location 95 to each of the destination bin locations 102-118 are chosen to provide the minimum risk factor for motion planning for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Overall trajectories therefore, may include any number of changing and unchanging sections. For example. networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products.

Figure 19:
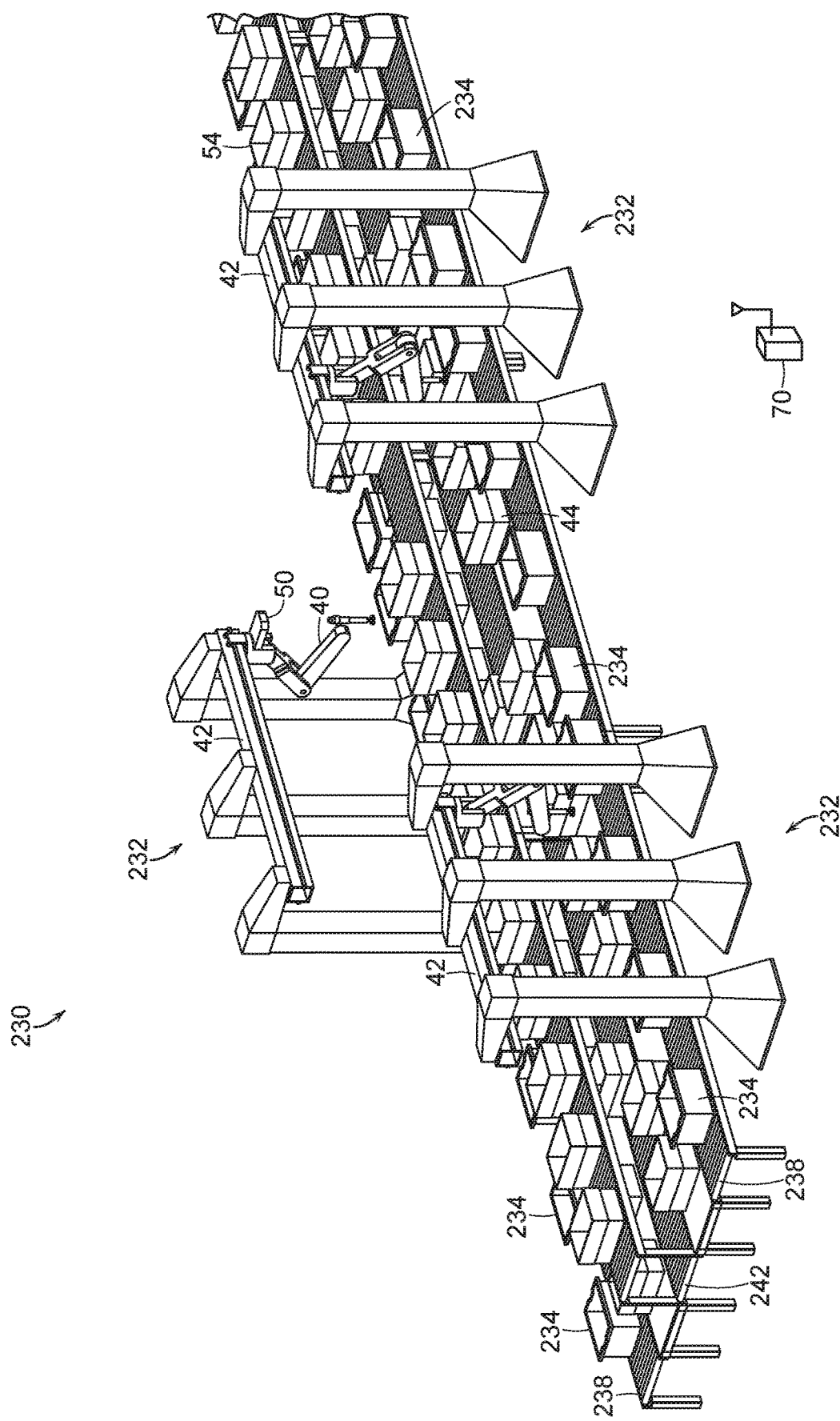
FIG. 19 shows an illustrative diagrammatic view of an object processing system in accordance with a further embodiment of the present invention involving multiple processing stations.

In accordance with a further embodiment of the present invention, and with reference to FIG. 19, a multi-station system 230 includes multiple processing stations 232 that are similar to those shown in at 30 in FIG. 2. The processing stations receive decanted vendor bins 234 via a pair of input conveyors 238, each of which includes adjacent processing locations at which break-pack packages 244 are filled. The system also includes an output conveyor 242 on which processed break-pack packages 244 may be placed when completed. Each processing station 232 includes a programmable motion device that moves objects from an in-feed area to any of a plurality of processing locations as discussed above with reference to FIG. 2. The system 230 may further include multiple processing stations as well as multiple input conveyors and multiple output conveyors as shown.

The system, therefore, provides means that interface with the customer's outgoing object conveyance systems. When a bin (or package) is full as determined by the system (in monitoring system operation), a human operator may pull the bin from the processing area, and place the bin in an appropriate conveyor. When a bin is full gets removed to the closed/labelled, another empty bin is immediately placed in the location freed up by the removed full bin, and the system continues processing as discussed above.

In accordance with a specific embodiment, the invention provides a user interface that conveys all relevant information to operators, management, and maintenance personnel. In a specific embodiment, this may include lights indicating bins that are about to be ejected (as full), bins that are not completely properly positioned, the in-feed hopper content level, and the overall operating mode of the entire system. Additional information might include the rate of object processing and additional statistics. In a specific embodiment, the system may automatically print labels and scan labels before the operator places the packages on an output conveyor. In accordance with a further embodiment, the system may incorporate software systems that interface with the customer's databases and other information systems, to provide operational information to the customer's system, and to query the customer's system for object information.

Those skilled in the art will appreciate that numerous modifications and variations may be made to the above disclosed embodiments without departing from the spirit and scope of the present invention.

What is claimed is:

1. A method of processing objects using a programmable motion device, said method comprising:
   perceiving identifying indicia representative of an identity of a plurality of objects;
   directing the plurality of objects toward an input area from at least one input conveyance system;
   acquiring an object from the plurality of objects at the input area using an end effector of the programmable motion device;
   moving the acquired object toward an identified processing location using the programmable motion device, said identified processing location holding a processing bin associated with the identifying indicia and said identified processing location being provided as one of a plurality of processing locations with a plurality of processing bins along a first direction, and wherein moving the acquired object includes moving the programmable motion device along a second direction that is substantially parallel with the first direction;
   placing the acquired object into the processing bin at the identified processing location using the end effector of the programmable motion device; and
   pushing the processing bin containing the acquired object from the identified processing location onto an output conveyance system using the end effector of the programmable motion device, wherein the output conveyance system is substantially parallel with the first direction of the plurality of processing bins,
   wherein the plurality of processing locations with the plurality of processing bins are disposed between the at least one input conveyance system and the output conveyance system at the input area, and wherein the end effector of the programmable motion device extends transversely over the at least one input conveyance system towards the output conveyance system to push the processing bin from the identified processing location onto the output conveyance system.

2. The method as claimed in claim 1, wherein perceiving the identity of the plurality of objects includes perceiving indicia on one of the plurality of objects.

3. The method as claimed in claim 1, wherein perceiving the identity of the plurality of objects includes perceiving indicia on a supply bin containing the plurality of objects.

4. The method as claimed in claim 1, wherein the plurality of objects are provided in one of a plurality of supply bins and wherein each supply bin includes a homogenous set of objects.

5. The method as claimed in claim 1, wherein the input area includes a plurality of input stations that are each accessible by the programmable motion device.

6. The method as claimed in claim 1, wherein the method further includes determining a grasp location of the object to be acquired from the plurality of objects at the input area.

7. The method as claimed in claim 1, wherein the base of the programmable motion device is configured to move along a track that is positioned on a floor below the input area.

8. The method as claimed in claim 1, wherein the base of the programmable motion device is configured to move along a track that is suspended from above with respect to the input area.

9. The method as claimed in claim 1, wherein the method further includes the step of replacing the processing bin transferred from the identified processing location with an empty bin using the end effector.

10. The method as claimed in claim 1, wherein the programmable motion device includes an articulated arm coupled to the end effector and wherein the processing bin is pushed from the identified processing location onto the output conveyance system using an outer surface of the end effector.

11. The method as claimed in claim 1, wherein each of the plurality of processing bins is provided at known locations.

12. The method as claimed in claim 11, wherein the method further includes determining an identity of each of a plurality of processing bins.

13. The method as claimed in claim 11, wherein the method further includes determining a plurality of locations of the plurality of processing bins.

14. A method of processing objects using a programmable motion device, comprising:
   perceiving, with a first perception system, identifying indicia on a supply bin representative of an identity of a homogeneous plurality of objects contained within the supply bin;
   recognizing, with a second perception system, the orientation of one or more objects in the supply bin;
   determining a grasp location on an object to be acquired;
   acquiring an object from the plurality of objects at an input area using an end effector of the programmable motion device to grasp the object at the determined grasp location;
   moving the acquired object toward an identified processing location using the programmable motion device, said identified processing location being associated with the identifying indicia and said identified processing location being provided as one of a plurality of processing locations that extend along a first direction, wherein moving the acquired object includes moving the programmable motion device along a second direction that is substantially parallel with the first direction;
   urging the processing bin containing the acquired object from the identified processing location onto an output conveyance system using the end effector of the programmable motion device; and
   acquiring an empty bin from an empty bin conveyance system using the end effector of the programmable motion device and placing the empty bin into the identified processing location vacated by the processing bin, wherein the empty bin conveyance system and the output conveyance system are vertically offset from each other at the input area, and wherein the end effector of the programmable motion device extends substantially transverse to the first direction and the second direction to acquire the empty bin from the empty bin conveyance system or to urge the processing bin from the identified processing location onto the output conveyance system.

15. The method as claimed in claim 14, wherein the programmable motion device is configured to move along a track that is positioned on a floor below the input area.

16. The method as claimed in claim 14, wherein the programmable motion device is configured to move along a track that is suspended from above with respect to the input area.

17. The method as claimed in claim 14, wherein the programmable motion device includes an articulated arm coupled to the end effector and wherein the processing bin is urged from the identified processing location onto the output conveyance system using an outer surface of the end effector.

18. The method as claimed in claim 14, wherein the plurality of processing locations are provided as a plurality of bins that are accessible for removal to an output conveyance system.

19. The method as claimed in claim 18, wherein each of the plurality of bins is provided at known locations.

20. A processing system for processing objects using a programmable motion device, said processing system comprising:

an input conveyance system for delivering a plurality of objects to an input area;

a plurality of processing locations extending along a first direction, each processing location having a processing bin;

an output conveyance system;

a perception unit for perceiving identifying indicia representative of an identity of the plurality of objects; and an acquisition system for acquiring an object from the plurality of objects at the input area using an end effector of the programmable motion device, the programmable motion device for moving the acquired object to the processing bin of an identified processing location, said identified processing location being associated with the identifying indicia, and said programmable motion device being movable along a second direction that is substantially parallel with the first direction, and said end effector being movable in a third direction that is substantially perpendicular to the first direction to push a filled processing bin from another processing location among the plurality of processing locations to the output conveyance system, said end effector of the programmable motion device being movable to grasp an empty bin from among a plurality of empty bins and place the empty bin into the processing location vacated by the filled processing bin, wherein the plurality of processing locations with the plurality of processing bins are disposed between the input conveyance system and the output conveyance system at the input area, and wherein the end effector of the programmable motion device extends transversely over the at least one input conveyance system towards the output conveyance system to push the filled processing bin onto the output conveyance system.

21. The processing system as claimed in claim 20, wherein the programmable motion device is configured to move along a track that is positioned on a floor below the input area.

22. The processing system as claimed in claim 20, wherein the base of the programmable motion device is configured to move along a track that is suspended from above with respect to the input area.

23. The processing system as claimed in claim 20, wherein said processing system is provided with a plurality of processing systems, each of which is in communication with the input conveyance system.

24. The processing system as claimed in claim 20, further comprising an empty bin conveyor conveying the plurality of empty bins, wherein said end effector is movable in a fourth direction that is substantially opposite the third direction to move the empty bin from the empty bin conveyor onto the processing location vacated by the filled processing bin.

25. The processing system as claimed in claim 20, wherein the programmable motion device includes an articulated arm coupled to the end effector and wherein the filled processing bin is pushed from the other processing location to the output conveyance system using an outer surface of the end effector.

* * * * *